(12) United States Patent
Chiba et al.

(10) Patent No.: US 11,758,324 B2
(45) Date of Patent: Sep. 12, 2023

(54) PSD OPTIMIZATION APPARATUS, PSD OPTIMIZATION METHOD, AND PROGRAM

(71) Applicant: NIPPON TELEGRAPH AND TELEPHONE CORPORATION, Tokyo (JP)

(72) Inventors: Hironobu Chiba, Tokyo (JP); Kenta Niwa, Tokyo (JP); Noboru Harada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 21 days.

(21) Appl. No.: 17/633,190

(22) PCT Filed: Aug. 8, 2019

(86) PCT No.: PCT/JP2019/031450
§ 371 (c)(1),
(2) Date: Feb. 5, 2022

(87) PCT Pub. No.: WO2021/024475
PCT Pub. Date: Feb. 11, 2021

(65) Prior Publication Data
US 2022/0279274 A1 Sep. 1, 2022

(51) Int. Cl.
*H04R 3/04* (2006.01)
*G06F 17/11* (2006.01)
(Continued)

(52) U.S. Cl.
CPC ............... *H04R 3/04* (2013.01); *G06F 17/11* (2013.01); *H04R 3/005* (2013.01); *H04R 5/04* (2013.01)

(58) Field of Classification Search
CPC . H04R 3/04; H04R 3/005; H04R 5/04; H04R 1/406; H04R 2430/03; H04R 2430/25; G06F 17/11; G06N 5/01
(Continued)

(56) References Cited

U.S. PATENT DOCUMENTS 8,712,951 B2 * 4/2014 Loewenstein .......... G01R 29/26
706/52
10,219,083 B2 * 2/2019 Farmani ............... H04R 25/552
(Continued)

OTHER PUBLICATIONS

Niwa et al. (2014) "Post-filter design for speech enhancement in various noisy environments" 2014 14th International Workshop on Acoustic Signal Enhancement(IWAENC), IEEE, Sep. 8, 2014.

*Primary Examiner* — Xu Mei

(57) ABSTRACT

Provided is sound source enhancement technology that is capable of improving sound source enhancement capabilities in a configuration using a beamformer to suppress interference noise. A PSD optimization device includes a PSD updating unit that takes a target sound PSD input value, an interference noise PSD input value, and a background noise PSD input value as input, and generates a target sound PSD output value, an interference noise PSD output value, and a background noise PSD output value, by solving an optimization problem for a cost function relating to a variable representing a target sound PSD, a variable representing an interference noise PSD, and a variable representing a background noise PSD. The optimization problem is defined using at least one of a constraint or a convex cost term based on difference in sound source enhancement characteristics of a beamformer in accordance with a degree of inclusion of a target sound, with regard to a PSD of signals beamformed in a target sound direction-of-arrival, and a constraint or a convex cost term based on the difference in sound source enhancement characteristics of the
(Continued)

beamformer in a frequency direction, with regard to the PSD of signals beamformed in the target sound direction-of-arrival.

20 Claims, 10 Drawing Sheets

(51) Int. Cl.
*H04R 3/00* (2006.01)
*H04R 5/04* (2006.01)

(58) Field of Classification Search
USPC .............. 381/98, 94.1–94.9, 56, 91, 92, 122
See application file for complete search history.

(56) References Cited

U.S. PATENT DOCUMENTS

| | | | |
|---|---|---|---|
| 2012/0093344 A1* | 4/2012 | Sun ........................ | H04R 3/005 367/138 |
| 2012/0224456 A1* | 9/2012 | Visser ..................... | G01S 7/521 367/118 |
| 2012/0243695 A1* | 9/2012 | Sohn ................... | H04R 25/407 381/56 |

* cited by examiner

Fig. 5

Algorithm 1 B-P-R splitting based PSD estimation algorithm

Initialization of $\tilde{p}^0, \tilde{q}^0, \tilde{r}^0$ for each frequency band
  for $t = 0, \ldots, T - 1$ do
    $u^{t+1} = \arg\min_u \left( F_1(u) + J_{D_p^*}(Au \| \tilde{p}^t) \right.$
                                     $\left. + J_{D_q^*}(Bu \| \tilde{q}^t - c) + J_{D_r^*}(u \| -\tilde{r}^t) \right)$
    $\tilde{p}^{t+1/2} = \tilde{p}^t - 2Au^{t+1}$
    $\tilde{q}^{t+1} = \tilde{q}^t - 2(Bu^{t+1} - c)$
    $\tilde{r}^{t+1/2} = \tilde{r}^t - 2u^{t+1}$
    $v^{t+1} = \arg\min_v \left( F_2(v) + J_{D_p^*}(v \| -\tilde{p}^{t+1/2}) \right)$
    $\tilde{p}^{t+1} = \tilde{p}^{t+1/2} + 2v^{t+1}$
    for $i = 1, \ldots, 3$ do
        $\tilde{r}_i^{t+1} = \begin{cases} \tilde{r}_i^{t+1/2} & \text{(if } \tilde{r}_i^{t+1/2} \geq 0\text{)} \\ -\tilde{r}_i^{t+1/2} & \text{(otherwise)} \end{cases}$
    end for
  end for

PSD OPTIMIZATION APPARATUS, PSD OPTIMIZATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/031450, filed on 8 Aug. 2019, the disclosure of which is hereby incorporated herein by reference in its entirety.

TECHNICAL FIELD

The present invention is an invention that relates to sound source enhancement technology for clearly extracting sound of a sound source in a particular direction, using a microphone array.

BACKGROUND ART

NPL 1 discloses a sound source enhancement technique that realizes target sound enhancement in real time. This technique is a low-computation-amount sound source enhancement technique that uses linear filtering by beamforming and nonlinear filtering by a Weiner filter. In this technique, a Weiner filter that enhances a target sound is constructed by estimating power spectral density (PSD: Power Spectral Density) of target sound, interference noise, and background noise, using enhanced signals of a sound source in a target sound direction of arrival and enhanced signals of sound sources in other directions, by a beamformer. Accordingly, the capabilities of the sound source enhancement technique described in NPL 1 are dependent on the PSD estimation precision.

Now, a target sound is a sound that has directionality, and that is emitted by a sound source regarding which enhancement is desired. Also, interference noise is, out of sounds other than the target sound (hereinafter referred to as interfering sound), sounds emitted from a sound source of which the direction of arrival can be identified, such as direct waves, early reflections, and so forth (e.g., speech of a person, who is at a direction other than the direction of arrival of the target sound, speaking). Background noise is sound that is, out of the interfering sound, emitted by a sound source of which the direction of arrival cannot be identified, such as reverberations, device noise, and so forth.

CITATION LIST

Non Patent Literature

[NPL 1] K. Niwa, Y. Hioka, and K. Kobayashi, "Post-filter design for speech enhancement in various noisy environments", 2014 14th International Workshop on Acoustic Signal Enhancement (IWAENC), IEEE, 2014.

SUMMARY OF THE INVENTION

Technical Problem

The technique according to NPL 1 uses a beamformer for suppressing interference noise, as described above. Accordingly, the quality of the target sound obtained by sound source enhancement according to NPL 1 may deteriorate, due to PSD estimation precision based on the capabilities of the beamformer to suppress interference noise.

Accordingly, it is an object of the present invention to provide sound source enhancement technology that is capable of improving sound source enhancement capabilities in a configuration using a beamformer to suppress interference noise.

Means for Solving the Problem

An aspect of the present invention is a PSD optimization device including a PSD updating unit that, with $u_S$ as a variable representing a target sound PSD, $u_{IN}$ as a variable representing an interference noise PSD, and $u_{BN}$ as a variable representing a background noise P, takes a target sound PSD input value $\hat{\varphi}_S(\omega, \tau)$, an interference noise PSD input value $\hat{\varphi}_{IN}(\omega, \tau)$, and a background noise PSD input value $\hat{\varphi}_{BN}(\omega, \omega)$ as input, and generates a target sound PSD output value $\hat{\varphi}_S(\omega, \tau)$, an interference noise PSI output value $\varphi_{IN}(\omega, \tau)$, and a background noise PSD output value $\varphi_{BN}(\omega\ \tau)$ by solving an optimization problem for a cost function relating to the variable $u_S$, the variable $u_{IN}$, and the variable $u_{BN}$. The optimization problem for the cost function is defined using at least one of a constraint based on difference in sound source enhancement characteristics of a beamformer in accordance with a degree of inclusion of a target sound, with regard to a PSD of a signal beamformed in a target sound direction-of-arrival, a convex cost term based on the difference in sound source enhancement characteristics of the beamformer in accordance with the degree of inclusion of the target sound, with regard to the PSD of signals beamformed in the target sound direction-of-arrival, a constraint based on the difference in sound source enhancement characteristics of the beamformer in a frequency direction, with regard to the PSD of signals beamformed in the target sound direction-of-arrival, and a convex cost term based on the difference in sound source enhancement characteristics of the beamformer in the frequency direction, with regard to the PSD of signals beamformed in the target sound direction-of-arrival.

Effects of the Invention

According to the present invention, sound source enhancement capabilities can be improved in a configuration using a beamformer to suppress interference noise.

BRIEF DESCRIPTION OF DRAWINGS

FIG. 5 is a diagram showing an example of an optimization algorithm.

DESCRIPTION OF EMBODIMENTS

Embodiments of the present invention will be described in detail below. Note that components that have the same function are denoted by the same signs, and repetitive description will be omitted.

Notation in the present specification will be explained in advance to description of the embodiments.

An _ (underscore) represents a subscript index. For example, $x^{y\_z}$ represents that $y_z$ is a superscript index of x, and $x_{y\_z}$ represents that $y_z$ is a subscript index of x.

Also, the superscript indices "^" and "~" such as ^x or ~x regarding a certain character x should actually be shown directly above the "x", but are written as ^x and ~x due to limitations in notation of description in the specification.

Technical Background

Embodiments of the present invention are to perform optimization processing with regard to a PSD of a target sound, a PSD of interference noise, and a PSD of background noise, estimated by the technique according to NPL 1, so that sound source enhancement capabilities are improved. Accordingly, the technique of NPL 1, which is a conventional technique, will be described first.

Conventional Technique

Figure 1:
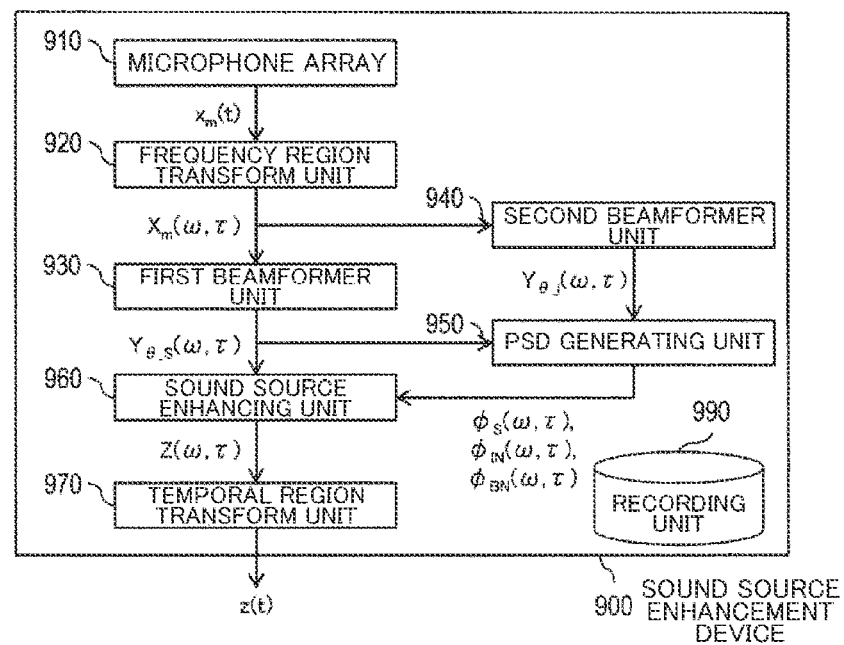
FIG. 1 is a block diagram illustrating a configuration of a sound source enhancement device 900.
Figure 2:
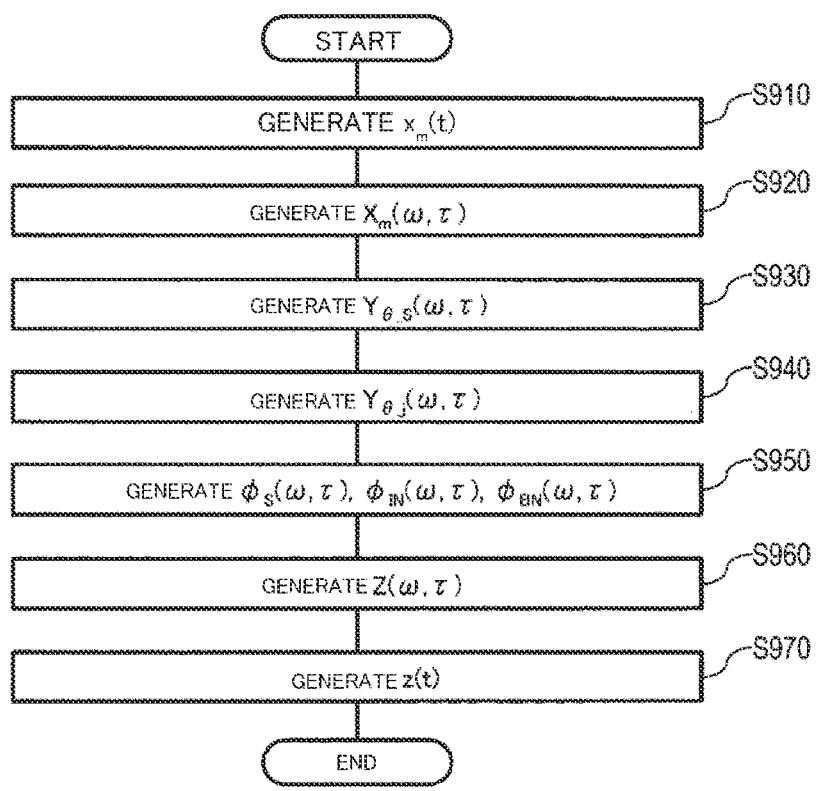
FIG. 2 is a flowchart showing operations of the sound source enhancement device 900.

A sound source enhancement device 900 will be described below with reference to FIG. 1 and FIG. 2. The sound source enhancement device 900 executes sound source enhancement on the basis of beamforming and PSD estimation. FIG. 1 is a block diagram illustrating a configuration of the sound source enhancement device 900. FIG. 2 is a flowchart showing operations of the sound source enhancement device 900. The sound source enhancement device 900 includes a microphone array 910, a frequency region transform unit 920, a first beamformer unit 930, a second beamformer unit 940, a PSD generating unit 950, a sound source enhancing unit 960, a temporal region transform unit 970, and a recording unit 990, as illustrated in FIG. 1. The recording unit 990 is a component that records information necessary for processing by the sound source enhancement device 900, as appropriate.

Operations of the sound source enhancement device 900 will be described following FIG. 2.

In S910, the microphone array 910, which is made up of K (where N is an integer of 2 or greater) microphone elements, generates and outputs temporal region observation signals $x_m(t)$ (m=0, 1, . . . , M−1) collected by microphone element m. Accordingly, m serves as a number indicating by which microphone element the signal has been observed.

In S920, the frequency region transform unit 920 takes the temporal region observation signals $x_m(t)$ (m=0, 1, . . . , M−1) generated in S910 as input, and transforms each of temporal region observation signals $x_m(t)$ (m==0, 1, . . . , M−1) into frequency region, thereby generating frequency region observation signals $X_m(\omega, \tau)$ (m=0, 1, . . . , M−1), which are output. Discrete Fourier transform can be used for transforming into the frequency region, for example.

The frequency region observation signals $X_m(\omega, \tau)$ are modeled below by the following Expression using target sound s $(\omega, \tau) \in C$, a K number (where K is an integer of 1 or greater) of interference noise $v_k(\omega, \tau) \in C$, and background noise $\varepsilon_m(\omega, \tau) \in C$.

[Math. 1]

$$X_m(\omega, \tau) = h_m^S(\omega)s(\omega, \tau) + \sum_{k=1}^{K} h_{k,m}^{IN}(\omega)v_k(\omega, \tau) + \varepsilon_m(\omega, \tau)$$

Here, $\omega$, $\tau$ represent the angular frequency bin and time frame No., respectively. Also, $h_m^S(\omega) \in C$ is a transfer function between the sound source of the target sound and the microphone element m, and $h_{k,m}^{IN}(\omega) \in C$ (k=1, . . . , K) is a transfer function between an interference noise source k and each microphone element m.

In this model, a problem can be handed in which the direction of arrival (DOA: Direction of arrival) of the target sound is known, while the information relating to noise, such as the direction of arrival and number of interference noises, the noise level of background noise, and so forth, for example, is unknown.

In S930, the first beamformer unit 930 takes the frequency region observation signals $X_m(\omega, \tau)$ (m=0, 1, . . . , M−1) generated in S920 as input, and generates and outputs enhanced signals $Y_{\theta\_S}(\omega, \tau)$ of a sound source at a target sound direction-of-arrival $\theta_S$ (hereinafter referred to as first enhanced signals $Y_{\theta\_S}(\omega, \tau)$) by performing linear filtering of the frequency region observation signals $X_m(\omega, \tau)$ (m=0, 1, . . . , M−1). In a case in which the arrival time difference of the target sound direction-of-arrival $\theta_S$ is known, the first enhanced signals $Y_{\theta\_S}$ are calculated from the following Expression, by a beamforming linear filter (i.e., a beamforming linear filter constructed using the arrival time difference of the target sound direction-of-arrival $\theta_S$) $w_{\theta\_S}^H \in C^M$.

[Math. 2]

$$Y_{\theta_S}(\omega, \tau) = w_{\theta_S}^H(\omega)X(\omega, \tau)$$

Here, $\cdot^H$ represents a complex conjugate transpose. Also, $X(\omega, \tau) = [X_0(\omega, \tau), \ldots, X_{M-1}(\omega, \tau)]^T$ holds.

In S940, the second beamformer unit 940 takes the frequency region observation signals $K_m(\omega, \tau)$ (m=0, 1, . . . , M−1) generated in S920 as input, and generates and outputs L−1 (where L−1 is an integer that is K or greater) enhanced signals $Y_{\theta\_j}(\omega, \tau)$ (j=1, . . . , L−1) of sound sources of directions $\theta_j$ other than the target sound direction-of-arrival (hereinafter referred to as second enhanced signals $Y_{\theta\_j}(\omega, \tau)$) by linear filtering of the frequency region observation signals $X_m(\omega, \tau)$ (m=0, 1, . . . , M−1). The second beamformer unit 940 calculates the second enhanced signals $Y_{\theta\_j}(\omega, \tau)$ by the same method as the first beamformer unit 930. That is to say, the second beamformer unit 940 calculates the second enhanced signals $Y_{\theta\_j}(\omega, \tau)$ by the beamforming linear filter constructed using the arrival time difference of directions $\theta_j$ other than the target sound direction-of-arrival, set in advance.

In S950, the PSI generating unit 950 takes the first enhanced signals $Y_{\theta\_S}(\omega, \tau)$ generated in S930 and the second enhanced signals $Y_{\theta\_j}(\omega, \tau)$ (j=1, . . . , L−1) generated in S940 as input, and generates and outputs target sound PSD $\varphi_S(\omega, \tau)$, interference noise PSD $\varphi_{IN}(\omega, \tau)$, and background noise PSD $\varphi_{BN}(\omega, \tau)$, using the first enhanced signals $Y_{\theta\_S}(\omega, \tau)$ and the second enhanced signals $Y_{\theta\_j}(\omega, \tau)$ (j=1, . . . , L−1).

Figure 3:
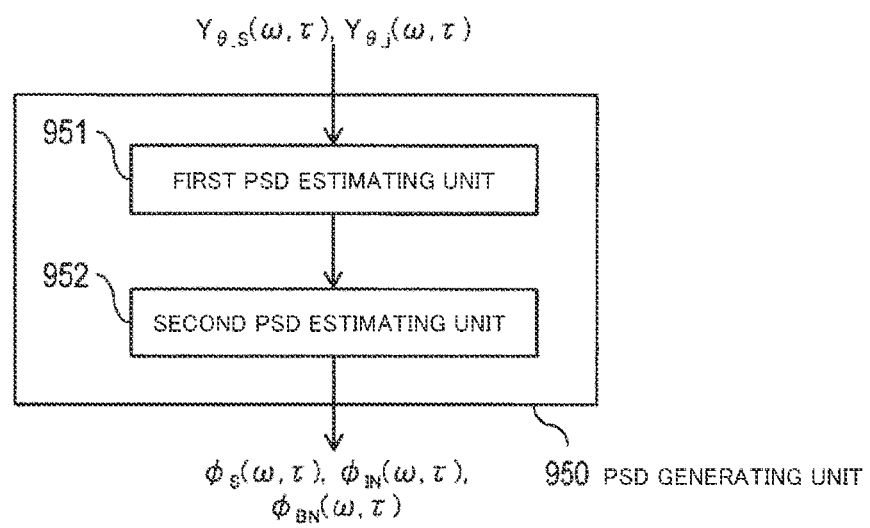
FIG. 3 is a block diagram illustrating a configuration of a PSD generating unit 950.
Figure 4:
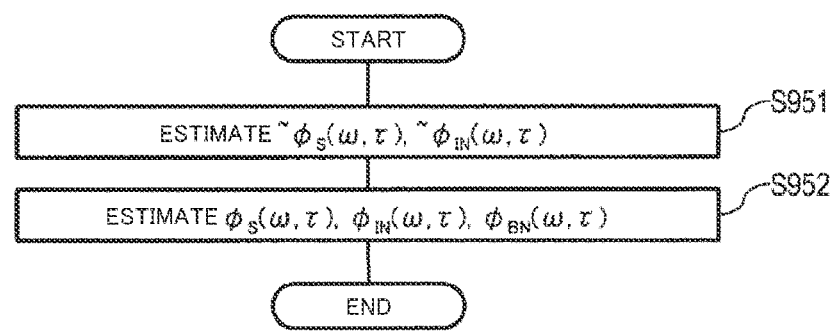
FIG. 4 is a flowchart showing operations of the PSD generating unit 950.

The PSD generating unit 950 will be described below with reference to FIG. 3 and FIG. 4. FIG. 3 is a block diagram illustrating a configuration of the PSD generating unit 950. FIG. 4 is a flowchart showing operations of the PSD generating unit 950. The PSD Generating unit 950 includes a first PSD estimating unit 951 and a second PSD estimating unit 952, as illustrated in FIG. 3.

The operations of the PSD estimating unit 950 will be described following FIG. 4.

In S951, the first PSD estimating unit 951 takes the first enhanced signals $Y_{\theta\_S}(\omega, \tau)$ generated in S930 and the second enhanced signals $Y_{\theta\_j}(\omega, \tau)$ (j=1, . . . , L−1) generated in S940 as input, and performs local PSD estimation using the first enhanced signals $Y_{\theta\_S}(\omega, \tau)$ and the second enhanced signals $Y_{\theta\_j}(\omega, \tau)$ (j=1, . . . , L−1). The first PSD estimating unit 951 accordingly estimates and outputs the target sound PSD $\tilde{\varphi}_S(\omega, \tau)$ and the interference noise PSD $\tilde{\varphi}_{IN}(\omega, \tau)$. Local PSD estimation is a technique for estimating the target sound PSD and the interference noise PSD, using difference in gain on the basis of spatial positions of the target sound and the interference noise. The relation between PSD $\varphi^{BF}(\omega, \tau) = [\varphi_0^{BF}(\omega, \tau), \varphi_1^{BF}(\omega \in \tau), \ldots, \varphi_{L-1}^{BF}(\omega, \tau)]^T \in R^L$ of the first enhanced signals $Y_{\theta\_S}(\omega, \tau)$ and L−1 second enhanced signals $Y_{\theta\_j}(\omega\ \tau)$, and PSD $\varphi^G(\omega, \tau) = [\varphi_1^G(\omega, \tau), \varphi_1^G(\omega, \tau), \ldots, \varphi_{N-1}^G(\omega, \tau)]^T \in R^N$ of target sound and interference noise grouped in N (where N is an integer or two or more) directions can be approximately expressed as in a form of linear transform as in the following Expression.

[Math. 3]

$$\begin{bmatrix} \varphi_0^{BF}(\omega, \tau) \\ \vdots \\ \varphi_{L-1}^{BF}(\omega, \tau) \end{bmatrix}_{\varphi^{BF}(\omega,\tau)} = \begin{bmatrix} |D_{0,0}(\omega)|^2 & \cdots & |D_{0,N-1}(\omega)|^2 \\ \vdots & \ddots & \vdots \\ |D_{L-1,0}(\omega)|^2 & \cdots & |D_{L-1,N-1}(\omega)|^2 \end{bmatrix}_{D_{power}(\omega)} \begin{bmatrix} \varphi_0^G(\omega, \tau) \\ \vdots \\ \varphi_{N-1}^G(\omega, \tau) \end{bmatrix}_{\varphi^G(\omega,\tau)}$$

Note, however, that $\varphi_0^{BF}(\omega\tau)$ is the PSD of the first enhanced signals $Y_{\theta\_S}(\omega, \tau)$. Accordingly, $\varphi_0^{BF}(\omega, \tau) = |Y_{\theta\_S}(\omega, \tau)|^2$ holds. Also, $D_{j,n}(\omega) \in R^{L'N'\Omega}$ is sensitivity as to direction n at the angular frequency bin $\omega$ and beamformer j. Here, beamformer 0 is the beamformer at the target sound direction-of-arrival $\theta_S$, and beamformer j is beamformers of directions $\theta_j$ other than the target sound direction-of-arrival.

Solving this Expression yields $\varphi^G(\omega, \tau) \in R^N$. That is to say, first, the first PSD estimating unit 951 solves this expression to obtain $\varphi^G(\omega, \tau) \in R^N$.

[Math. 4]

$$\varphi^G(\omega, \tau) = \left[ D^*_{power}(\omega) \varphi^{BF}(\omega, \tau) \right]_+$$

Here, •* and [•]+ respectively indicate a pseudo-inverse matrix and an operator that makes each element of the matrix to be a non-negative value.

Note that in order to reduce computation amount, performing PSD estimation with a frequency filter bank integrated into several frequency bands is effective.

In the above Expression, assuming that the PSD of the sound source of the target sound direction-of-arrival $\theta_S$ is included at direction 0, and the PSD of a group at a different direction from the target sound is included at direction 1 through direction N−1, the target sound PSD $\tilde{\varphi}_S(\omega, \tau)$ and the interference noise PSD $\tilde{\varphi}_{IN}(\omega, \tau)$ are estimated by the following Expression. That is to say, next, the first PSD estimating unit 951 estimates the target sound PSD $\tilde{\varphi}_S(\omega, \tau)$ and the interference noise PSD $\tilde{\varphi}_{IN}(\omega, \tau)$ by the following Expressions.

[Math. 5]

$$\tilde{\varphi}_S(\omega, \tau) = \varphi_0^G(\omega, \tau)$$

$$\tilde{\varphi}_{IN}(\omega, \tau) = \sum_{n=1}^{N-1} \varphi_n^G(\omega, \tau)$$

In S952, the second PSD estimating unit 952 takes the target sound PSD $\tilde{\varphi}_S(\omega, \tau)$ and the interference noise PSD $\tilde{\varphi}_{IN}(\omega, \tau)$ estimated in S952 as input, and estimates and outputs the target sound PSD $\varphi_S(\omega, \tau)$, the interference noise PSD $\varphi_{IN}(\omega, \tau)$, and the background noise PSD $\varphi_{BN}(\omega, \tau)$, using the target sound PSD $\tilde{\varphi}_S(\omega, \tau)$ and the interference noise PSD $\tilde{\varphi}_{IN}(\omega, \tau)$. The estimation method will be described below. The background noise can be assumed to be steady. Accordingly, first, the second PSD estimating unit 952 uses PSD •$\varphi_S(\omega, \tau)$, •$\varphi_{IN}(\omega, \tau)$, smoothed by recursive smoothing computation, to calculate two background noise PSDs $\varphi_{BN\_S}(\omega, \tau)$, $\varphi_{BN\_IN}(\omega, \tau)$ as minimums in a certain section $\Gamma$.

[Math. 6]

$$\varphi_{BN_S}(\omega, \tau) = \min\{\hat{\varphi}_S(\omega, \tau - \Gamma), \cdots, \hat{\varphi}_S(\omega, \tau)\}$$

$$\varphi_{BN_{IN}}(\omega, \tau) = \min\{\hat{\varphi}_{IN}(\omega, \tau - \Gamma), \cdots, \hat{\varphi}_{IN}(\omega, \tau)\}$$

$$\hat{\varphi}_S(\omega, \tau) = \beta_S \tilde{\varphi}_S(\omega, \tau) + (1 - \beta_S) \hat{\varphi}_S(\omega, \tau - 1)$$

$$(0 < \beta_S \leq 1)$$

$$\hat{\varphi}_{IN}(\omega, \tau) = \beta_{IN} \tilde{\varphi}_{IN}(\omega, \tau) + (1 - \beta_{IN}) \hat{\varphi}_{IN}(\omega, \tau - 1)$$

$$(0 < \beta_{IN} \leq 1)$$

Here, $\beta_S$ and $\beta_{IN}$ are each forgetting coefficients. Note that $\beta_S$ and $\beta_{IN}$ are decided taking into consideration temporal energy change of the target sound, interference noise, and background noise.

The second PSD estimating unit 952 then estimates the target sound PSD $\varphi_S(\omega, \tau)$, interference noise PSD $\varphi_{IN}(\omega, \tau)$, and background noise PSD $\varphi_{BN}(\omega, \tau)$, by the following Expressions.

[Math. 7]

$$\varphi_S(\omega, \tau) = \tilde{\varphi}_S(\omega, \tau) - \varphi_{BN_S}(\omega, \tau)$$

$$\varphi_{IN}(\omega, \tau) = \tilde{\varphi}_{IN}(\omega, \tau) - \varphi_{BN_{IN}}(\omega, \tau)$$

$$\varphi_{BN}(\omega, \tau) = \varphi_{BN_S}(\omega, \tau)$$

In S960, the sound source enhancing unit 960 takes, as input, the first enhanced signals $Y_{\theta\_S}(\omega, \tau)$ generated in S930, and the target sound PSD $\varphi_S(\omega, \tau)$, interference noise PSD $\varphi_{IN}(\omega, \tau)$, and background noise PSD $\varphi_{BN}(\omega, \tau)$, generated in S950. The sound source enhancing unit 960 then uses the first enhanced signals $Y_{\theta\_S}(\omega, \tau)$, target sound PSD $\varphi_S(\omega, \tau)$, interference noise PSD $\varphi_{IN}(\omega, \tau)$, and background noise PSD $\varphi_{BN}(\omega, \tau)$, to generate and output frequency region target sound signals $Z(\omega, \tau) \in \mathbb{C}$. Specifically, the sound source enhancing unit 960 calculates the frequency region target sound signals $Z(\omega, \tau)$ from the following Expression, using a Weiner filter calculated from the target sound PSD $\varphi_S(\omega, \tau)$, interference noise PSD $\varphi_{IN}(\omega, \tau)$, and background noise PSD $\varphi_{BN}(\omega, \tau)$.

[Math. 8]

$$Z(\omega, \tau) = \frac{\varphi_S(\omega, \tau)}{\varphi_S(\omega, \tau) + \varphi_{IN}(\omega, \tau) + \varphi_{BN}(\omega, \tau)} Y_{\theta_S}(\omega, \tau)$$

In S970, the temporal region transform unit 970 takes the frequency region target sound signals $Z(\omega, \tau)$ generated in S960 as input, and generates and outputs temporal region target sound frequency region observation signals $z(t) \in \mathbb{R}$ by transform, of the frequency, region target sound signals $Z(\omega, \tau)$ into the temporal region. Inverse transform of discrete Fourier transform, for example, can be used for performing transform to temporal region.

Optimization of PSD

A method will be described here regarding optimization of the PSD generated by the technique according to NPL 1, to improve sound source enhancement capabilities, taking into consideration beamformer characteristics.

There are the following three features in this optimization method.
(1) At least one PSD of the target sound PSD, interference noise PSD, and background noise PSD is optimized.
(2) The optimization processing of (1) is formulated as an optimization problem of a cost function represented as one convex cost term or a sum of a plurality of convex cost terms relating to a variable representing the PSD, under constraints relating to the PSD.
(3) The optimization problem of (2) is defined using the constraint or convex cost term of (a), the constraint of (b), the constraint or convex cost term of (c), and the constraint or convex cost term of (d), listed below, for example. Note however, that two or more may be used out of each of the constraint or convex cost term of (c) and the constraint or convex cost term of (d). Also, including the constraint or convex cost term of (a), the constraint of (b), and the constraint or convex cost term of (c), is not indispensable.

(a) constraint or convex cost term based on assumption that a certain level of estimation has been achieved by the conventional PSD estimation (i.e., output of the PSD estimating unit 950)
(b) non-negative constraint of PSD
(c) constraint or convex cost term relating to PSD, based on structure of sound source Note that here, the structure of sound source means the frequency, structure, temporal structure, and spatial structure (inter-channel structure) of the target sound, interference noise, and background noise.
(d) constraint or convex cost term, relating to PSD, based on beamformer characteristics In the above optimization problem, constraints relating to PSD are expressed by linear equalities or inequalities, and cost functions are expressed as functions combining one or more convex cost terms relating to a variable representing PSD (cost term that is a closed proper convex function). That is to say, the optimization problem is a convex optimization problem with linear constraint. The optimized PSD is then obtained as the solution to this optimization problem.

One or more convex cost terms and zero or more constraints are used for this convex optimization problem with linear constraint. Increasing convex cost terms or constrains makes the optimization problem complicated, but can be solved with a low computation amount to a degree that enables real-time sound source enhancement processing by using later-described Bregman monotone operator splitting (B-MOS: Bregman Monotone Operator Splitting).

Hereinafter, the target sound PSD $\varphi_S(\omega, \tau)$, interference noise PSD $\varphi_{IN}(\omega, \tau)$, and background noise PSD $\varphi_{BN}(\omega, \tau)$, estimated by the second PSD estimating unit 952 will be respectively written as $\hat{\varphi}_S(\omega, \tau)$, $\hat{\varphi}_{IN}(\omega, \tau)$, and $\hat{\varphi}_{BN}(\omega, \tau)$.

1: Specific Examples of Constraints and Convex Cost Terms

Specific examples of constraints and convex cost terms for (a) through (d) will be described here. The constraints or convex cost terms of (c) can be classified as follows.
(c-1) constraints or convex cost terms based on frequency structure of sound source
(c-2) constraints or convex cost terms based on temporal structure of sound source
(c-3) constraints or convex cost terms based on spatial structure (inter-channel structure) of sound source Also, the constraints or convex cost terms of (d) can be classified as follows, for example.
(d-1) constraints or convex cost terms based on difference in sound source enhancement characteristics of beamformer in accordance with degree of inclusion of target sound, with regard to PSD of signals beamformed in target sound direction-of-arrival
(d-2) constraints or convex cost terms based on difference in sound source enhancement characteristics of beamformer in frequency direction, with regard to PSD of signals beamformed in target sound direction-of-arrival First, variables that are the object of optimization in an optimization problem will be described.

1-1: Definition of Variables

PSD is organized in optional frequency bands. The number of frequency bands here is $\Omega$.

A variable representing the target sound PSD, a variable representing the interference noise PSD, and a variable representing the background noise PSD, in time frame $\tau$, are $u_{S,\tau}$, $u_{IN,\tau}$, and $u_{BN,\tau}$, respectively. Also, a target sound PSD input value, an interference noise PSD input value, and a background noise PSD input value, in time frame $\tau$, are $\hat{\varphi}_{S,\tau}$, $\hat{\varphi}_{IN,\tau}$, and $\hat{\varphi}_{BN,\tau}$, respectively. That is to say,

[Math. 9]

$$u_{i,\tau} = [\varphi_i(0, \tau), \cdots, \varphi_i(\Omega - 1, \tau)]^T$$
$$i \in \{S, IN, BN\}$$
$$\hat{\varphi}_{i,\tau} = [\hat{\varphi}_i(0, \tau), \cdots, \hat{\varphi}_i(\Omega - 1, \tau)]^T$$
$$i \in \{S, IN, BN\}$$

hold. Also, $u = [u_{S,\tau}^T, u_{IN,\tau}^T, u_{BN,\tau}^T]^T$, and $\hat{\varphi}_\tau = [\hat{\varphi}_{S,\tau}^T, \hat{\varphi}_{IN,\tau}^T, \hat{\varphi}_{BN}^T]^T$ hold.

Also, $c_\tau \in R^\Omega$ is defined by the following Expression for PSD $\varphi_{Y_{\theta\_S}}$ of the first enhanced signals in time frame $\tau$ (i.e., signals beamformed in target sound direction-of-arrival $\theta_S$) $Y_{\theta\_S}(\omega, \tau)$.

[Math. 10]
$$c_\tau = \left[\varphi_{Y_{S_\theta}}(0, \tau), \cdots, \varphi_{Y_{S_\theta}}(\Omega - 1, \tau)\right]^T$$

Accordingly, $c_\tau$ is the PSD estimation value of enhanced signals of the sound source at the target sound direction-of-arrival $\theta_S$ in time frame $\tau$.

Hereinafter, in cases of describing constraints or convex cost terms that are not dependent on preceding or following time frames, the time frame index $\tau$ will be omitted.

1-2: Constraint or Convex Cost Term Based on Assumption That Certain Level of Estimation has Been Achieved by Conventional PSD Estimation (i.e., Output of PSD Estimating Unit 950

The value of the variable $u = [u_S^T, u_{IN}^T, u_{BN}^T]^T$ is assumed to be a value close to the PSD input value $\hat{\varphi} = [\hat{\varphi}_S^T, \hat{\varphi}_{IN}^T, \hat{\varphi}_{BN}^T]^T$. A convex cost term corresponding to this assumption can be expressed by a quadratic function such as in the following Expressions, for example.

[Math. 11]
$$L(u_S) = \frac{w_S}{2} \|u_S - \hat{\varphi}_S\|_2^2$$
$$L(u_{IN}) = \frac{w_{IN}}{2} \|u_{IN} - \hat{\varphi}_{IN}\|_2^2$$
$$L(u_{BN}) = \frac{w_{BN}}{2} \|u_{BN} - \hat{\varphi}_{BN}\|_2^2$$

Here, $w_i \in R^+$ ($i \in \{S, IN, BN\}$) is a coefficient for adjusting weighting of convex cost terms (weighting coefficient) Note that $R^+$ represents a set of positive real numbers.

These convex cost terms may also be combined and used. For example, in a case of optimizing the three PSDs of the target sound, interference noise, and background noise, convex cost terms such as in the following Expression can be used.

[Math. 12]
$$L(u) = L(u_S) + L(u_{IN}) + L(u_{BN})$$

1-3: Non-Negative Constraint of PSD

PSDs are non-negative values. Accordingly, constraints can be applied by inequalities of $u_S \geq 0$, $u_{IN} \geq 0$, $u_{BN} \geq 0$, i.e., $u \geq 0$.

1-4: Constraint or Convex Cost Term Based on Frequency Structure of Sound Source The frequency structure of the target sound will be described here as one example.

The target sound PSD input value $\hat{\varphi}_S$ contains interference noise PSD and background noise PSD that have not completely been split, as small values. In a case where the target sound is speech, for example, the harmonic structure of the target sound PSD can be assumed, and accordingly prior knowledge such as being sparce in the frequency direction, that there is an overtone structure in the frequency direction, that there is co-occurrence relations in frequency bands adjacent to overtones, and so forth, and be used. Accordingly, it is anticipated that the target sound PSD and noise PSD (i.e. interference noise PSD and background noise PSD) can be split by using constraints and convex cost terms based on such prior knowledge. Accordingly, convex cost terms corresponding to the above assumption will be expressed using an $L_1$ norm. Note however, that sparce target sound PSD is estimated in a region weighted using $\Lambda \in R^{\Omega \times \Omega}$, to keep from deleting components that are small values but are auditorily important. Also, in order to stabilize the optimization algorithm, a squared error of a signal where the target sound PSD input value $\hat{\varphi}_S$ is transformed by $\Lambda$ is added to the cost term. To summarize the above, the cost term of the target can be expressed by the following Expression.

[Math. 13]
$$L(u_S) = \mu \|\Lambda u_S\|_1 + \frac{\rho}{2} \|\Lambda u_S - \Lambda \hat{\varphi}_S\|_2^2$$

Here, $\mu$, $\rho (\in R^+)$ are weighting coefficients. Also, $\Lambda (\in R^{\Omega \times \Omega})$ is a predetermined sparce matrix.

Specific examples of $\Lambda \in R^{\Omega \times \Omega}$ are the following ($\alpha$) and ($\beta$). These ($\alpha$) and ($\beta$) may be combined.

($\alpha$) Frequency Weighting Matrix $\Lambda_w$

[Math. 14]
$$\Lambda_w = \begin{pmatrix} \lambda_0 & 0 & \cdots & 0 \\ 0 & \lambda_1 & \cdots & 0 \\ \vdots & \vdots & \ddots & \vdots \\ 0 & 0 & \cdots & \lambda_{\Omega-1} \end{pmatrix}$$
$$(\lambda_i \in R^+)$$

($\beta$) Matrix $\Lambda_{nb}$ for Smoothing With Adjacent Frequency Band

In a case of taking the moving average with one band Co each of the left and the right, the matrix $\Lambda_{nb}$ is as in the following Expression.

[Math. 15]
$$\Lambda_{nb} = \begin{pmatrix} 1 & 1 & 0 & 0 & \cdots & 0 \\ 1 & 1 & 1 & 0 & \cdots & 0 \\ 0 & 1 & 1 & 1 & \cdots & 0 \\ \vdots & \vdots & \vdots & \vdots & \ddots & \vdots \\ 0 & 0 & 0 & 0 & \cdots & 1 \end{pmatrix}$$

1-5: Constraints or Convex Cost Terms Based on Temporal Structure of Sound Source Smoothing with the PSD of the immediately-preceding time frame will be described here as one example.

Suppression of distortion can be anticipated by assuming that the value of PSD will smoothly change between preceding and following time frames. A convex cost term corresponding to this assumption can be expressed as a term using a squared error such as in the following Expression, for example.

[Math. 16]

$$L(u_{BN,\tau}) = \frac{\gamma_{BN}}{2}\|\hat{\varphi}_{BN,\tau-1} - u_{BN,\tau}\|_2^2$$

Note that $\hat{\varphi}_{BN,\tau-1}$ is a background noise PSD estimation value at time frame $\tau-1$. Also, $\gamma_{BN}$ ($\in R^+$) is a weighting coefficient.

Estimation of background noise PSD that is smooth in the temporal direction can be performed by minimizing this cost term. Note that in a case in which the target sound or interference noise is singing, musical instruments, or the like, for example, the target sound and the interference noise are also smooth in the temporal direction, and accordingly a convex cost term such as in the above Expression for background noise can be used for the target sound and interference noise as well (see following Expressions).

[Math. 17]

$$L(u_{S,\tau}) = \frac{\gamma_S}{2}\|\hat{\varphi}_{S,\tau-1} - u_{S,\tau}\|_2^2$$

$$L(u_{IN,\tau}) = \frac{\gamma_{IN}}{2}\|\hat{\varphi}_{IN,\tau-1} - u_{IN,\tau}\|_2^2$$

Note however, that $\hat{\varphi}_{S,\tau-1}$ and $\hat{\varphi}_{IN,\tau-1}$ respectively are target sound PSD estimation value at time frame $\tau-1$, and interference noise PSD estimation value at time frame $\tau-1$. Also, $\gamma_S$, $\gamma_{IN}$ ($\in R^+$) are weighting coefficients.

1-6: Constraints or Convex Cost Terms Based on Spatial Structure of Sound Source Additivity constraint of PSD will be described here as an example.

Assuming additivity of PSD in the frequency region, the sum of target sound PSD, interference noise PSD, and background noise PSD is close to a PSD estimation value c of enhanced signals of the sound source at the target sound direction-of-arrival $\theta_S$. A constraint regarding this assumption can be expressed by the following linear constraint, for example.

[Math. 18]

$$u_S + u_{IN} + u_{BN} = c$$

It is anticipated that by using this constraint, distortion will be reduced and components lost in upstream processing (i.e., at the output of the PSD generating unit 950) will be restored, consequently improving PSD estimation precision.

1-7: Constraints or Convex Cost Terms Based on Difference in Sound Source Enhancement Characteristics of Beamformer in Accordance With Degree of Inclusion of Target Sound, With Regard to PSD of Signals Beamformed in Target Sound Direction-of-Arrival The more dominantly the target sound is included, the higher the capabilities of the beamformer regarding sound source enhancement are. That is to say, in a time frame in which the target sound is dominant, the target sound PSD can be assumed to be close to the PSD estimation value c of enhanced signals of the sound source at the target sound direction-of-arrival $\theta_S$ by the beamformer (also referred to as PSD of signals beamformed in target sound direction-of-arrival). Accordingly, in a time frame in which the target sound is dominant, a convex cost term that brings the value of variable $u_S$ closer to c is effective in improving PSD estimation precision, and a convex cost item, corresponding to this assumption can be expressed by a quadratic function such as in the following Expression, for example.

[Math. 19]

$$L(u_S) = \frac{\gamma}{2}\|u_S - c\|_2^2 \qquad (1)$$

Here, $\gamma$ ($\in R^+$) is a weighting coefficient. Note that it is sufficient to set $\gamma$ to a value large enough that the target sound is dominant, and setting a $\gamma$ of a value large enough that the target sound PSD $\hat{\varphi}_S$ is larger than PSDs of noise (interference noise PSD $\hat{\varphi}_{IN}$, or background noise PSD $\hat{\varphi}_{BN}$, or interference noise PSD $\hat{\varphi}_{IN}$, and background noise PSD $\hat{\varphi}_{BN}$ combined), for example, is conceivable. Also conceivable, for example, is using the convex cost term of Expression (1) in a case in which a value obtained by subtracting the PSDs of noise from the target sound PSD $\hat{\varphi}_S$, or a value obtained by dividing the target sound PSD $\hat{\varphi}_S$ by the PSDs of noise, results in a value that exceeds a predetermined threshold value or is no less than a predetermined threshold value, and not using the convex cost term of Expression (1) in a case otherwise.

Also, the target sound PSD $\hat{\varphi}_S$ is a PSD estimation, value obtained on the basis of signals in which the sound source at the target sound direction-of-arrival $\theta_S$ by the beamformer is enhanced. Accordingly, the target sound PSD $\hat{\varphi}_S$ may be used instead of the PSD estimation value c of enhanced signals of the sound source at the target sound direction-of-arrival $\theta_S$. When using the target sound PSD $\hat{\varphi}_S$, the convex cost term corresponding to Expression (1) is as in the following Expression, for example.

[Math. 20]

$$L(u_S) = \frac{\gamma'}{2}\|u_S - \hat{\varphi}_S\|_2^2 \qquad (1)'$$

Here, $\gamma'$($\in R^+$) is a weighting coefficient.

1-8: Constraints or Convex Cost Terms Based on Difference in Sound Source Enhancement Characteristics of Beamformer in Frequency Direction, With Regard to PSD of Signals Beamformed in Target Sound Direction-of-Arrival Beamformers have a nature in that directivity is less pronounced at low-frequency bands (e.g., 500 Hz or lower), and in high-frequency bands (e.g. 4 kHz or higher) focal points are also formed at directions other than the target sound due to spatial aliasing. That is to say, regarding beamformers, the capabilities of suppressing sound from non-directions-of-arrival of beamformers is poor at low-frequency bands and high-frequency bands, as compared to midrange-frequency bands that are bands other than low-frequency bands and high-frequency bands. Accordingly, using a convex cost term that brings the value of variable $u_S$ close to c only in the midrange-frequency bands is effective in improving the PSD estimation precision in the low-frequency bands and high-frequency bands. Accordingly, a term is conceivable such as in the following Expressions, using a variable $u_{S\text{-}Mid}$ relating to the midrange-frequency bands defined regarding the variable $u_S$ representing the target sound PSD, and a PSD estimation value $c_{Mid}$ relating to the midrange-frequency bands defined regarding the PSD estimation value c of enhanced signals of the sound source at the target sound direction-of-arrival $\theta_S$, as a convex cost term, for example.

[Math. 21]

$$L(u_S) = \frac{\gamma_{Mid}}{2}\|u_{S\text{-}Mid} - c_{Mid}\|_2^2 \tag{2}$$

$$u_S = [\cdots, u_{S\text{-}Mid}^T, \cdots]^T$$

$$u_{S\text{-}Mid} = [u_S(\omega_L, \tau), u_S(\omega_L+1, \tau), \cdots, u_S(\omega_H, \tau)]^T$$

$$c = [\cdots, c_{Mid}^T, \cdots]^T$$

$$c_{Mid} = [c(\omega_L, \tau), c(\omega_L+1, \tau), \cdots, c(\omega_H, \tau)]^T$$

Here, $\gamma_{Mid}(\in R^+)$ is a weighting coefficient. Also, $\omega_L$ and $\omega_H$ satisfy $0<\omega_L<\omega_H<\Omega-1$.

Accordingly, bands of frequency bin Nos, $\omega_L$ through $\omega_H$ are equivalent to the midrange-frequency bands.

Also, the target sound PSD $\hat{\varphi}_S$ may be used instead of the PSD estimation value c of enhanced signals of the sound source at the target sound direction-of-arrival $\theta_S$. In this case, a convex cost term is conceivable such as in the following Expressions, using a variable $u_{S\text{-}Mid}$ relating to the midrange-frequency bands defined regarding the variable $u_S$ representing the target sound PSD, and a PSD $\hat{\varphi}_{S\text{-}Mid}$ relating to the midrange-frequency bands defined regarding the target sound PSD $\hat{\varphi}_S$, for example.

[Math. 22]

$$L(u_S) = \frac{\gamma'_{Mid}}{2}\|u_{S\text{-}Mid} - c_{Mid}\|_2^2 \tag{2'}$$

$$\hat{\varphi}_S = [\cdots, \hat{\varphi}_{S\text{-}Mid}^T, \cdots]^T$$

$$\hat{\varphi}_{S\text{-}Mid} = [\hat{\varphi}_S(\omega_L, \tau), \hat{\varphi}_S(\omega_L+1, \tau), \cdots, \hat{\varphi}_S(\omega_H, \tau)]^T$$

Here, $\gamma'_{Mid}(\in R^+)$ is a weighting coefficient.

1-9: Constraints or Convex Cost Terms Based on Difference in Sound Source Enhancement Characteristics of Beamformer in Frequency Direction, and Also Based on Harmonic Structure of Sound, with Regard to PSD of Signals Beamformed in Target Sound Direction-of-Arrival Beamformers have high interference noise suppression capabilities at midrange-frequency bands, as described in (1-8). Also, sound sources having harmonic structures such as vowels in speech have a high level of correlation between the harmonic structure of midrange-frequency bands and the harmonic structure of low-frequency bands, and a high level of correlation between the harmonic structure of midrange-frequency bands and the harmonic structure of high-frequency bands. Accordingly, an arrangement will be considered where signals are generated in which low-frequency bands and/or high-frequency bands that contain more noise are substituted by duplication of midrange-frequency bands that have less noise, with regard to the target sound PSD $\hat{\varphi}_S$ or the PSD estimation value c of enhanced signals of the sound source at the target sound direction-of-arrival $\theta_S$, for example, and using the same convex cost term as in (1-7) for these signals, thereby improving the PSD estimation frequency of low-frequency bands and high-frequency bands.

For example, a PSD estimation value $c_{SBR}$, obtained by substituting low-frequency bands using duplicated midrange-frequency bands in a PSD estimation value c of enhanced signals of the sound source at target sound direction-of-arrival $\theta_S$, is given by the following Expression.

[Math. 23]

$$c_{SBR} = [\alpha_{tilt}c_{Mid}^T, \cdots, c_{Mid}^T, c(\omega_H+1, \tau), \cdots, c(\Omega-1, \tau)]^T$$

Here, $\alpha_{tilt}(\in R^+)$ is a coefficient that adjusts so that the error between the low-frequency band PSD before substitution and $c_{Mid}$ is minimal. In other words, $\alpha_{tilt}(\in R^+)$ is a coefficient that keeps the size of the PSD estimation value $c_{SBR}$ following substitution from being greatly different from the PSD before substitution.

When this PSD estimation value $c_{SBR}$ is used, the convex cost term is as in the following Expression, for example.

[Math. 24]

$$L(u_S) = \frac{\gamma_{SBR\text{-}c}}{2}\|u_S - c_{SBR}\|_2^2 \tag{3}$$

Here, $\gamma_{SBR\text{-}c}(\in R^+)$ is a weighting coefficient.

Also, target sound PSD $\hat{\varphi}_S$ may be used instead of the PSD estimation value c of enhanced signals of the sound source at the target sound direction-of-arrival $\theta_S$. In this case, a PSD estimation value $\hat{\varphi}_{S\text{-}SBR}$, obtained by substituting low-frequency bands using duplicated midrange-frequency bands in the target sound PSD $\hat{\varphi}_S$, given by the following Expression.

[Math. 25]

$$\hat{\varphi}_{S\text{-}SBR} = [\beta_{tilt}\hat{\varphi}_{S\text{-}Mid}^T, \cdots, \hat{\varphi}_{S\text{-}Mid}^T, \hat{\varphi}_S(\omega_H+1, \tau), \cdots, \hat{\varphi}_S(\Omega-1, \tau)]^T$$

Here, $\beta_{tilt}(\in R^+)$ is a coefficient that adjusts so that the error between the low-frequency band PSD before substitution and $\hat{\varphi}_{S\text{-}Mid}$ is minimal.

When this PSD estimation value $\hat{\varphi}_{S\text{-}SBR}$ is used, the convex cost term is as in the following Expression, for example.

[Math. 26]

$$L(u_S) = \frac{\gamma_{SBR\text{-}\hat{\varphi}}}{2}\|u_S - \hat{\varphi}_{S\text{-}SBR}\|_2^2 \tag{3'}$$

Here, $\gamma_{SBR\text{-}\hat{\varphi}}(\in R^+)$ is a weighting coefficient.

1-10: Summarization

The convex cost terms described in (1-7) through (1-9) are examples of constraints or convex cost terms relating to PSD, based on beamformer characteristics. Accordingly, the optimization problem is an optimization problem of a cost function relating to the variable $u_S$, the variable $u_{IN}$, and the variable $u_{BN}$, and is defined using one of (1) constraints based on the difference in sound source enhancement characteristics of the beamformer in accordance with the degree of inclusion of the target sound, with regard to the PSD of signals beamformed in target sound direction-of-arrival, (2) convex cost terms based on the difference in sound source enhancement characteristics of the beamformer in accordance with the degree of inclusion of the target sound, with regard to the PSD of signals beamformed in target sound direct on-of-arrival, (3) constraints based on the difference in sound source enhancement characteristics of the beamformer in the frequency direction, with regard to the PSD of signals beamformed in target sound direction-of-arrival, and (4) convex cost terms based on the difference in sound source enhancement characteristics of the beamformer in the frequency direction, with regard to the PSD of signals beamformed in target sound direction-of-arrival, at the least.

Note that the optimization problem may be defined in a form such as described below, as a matter of course. Now, this form is a form in which a constraint or convex cost term based on assumption that a certain level of estimation has been achieved by the conventional PSD estimation (i.e., output of the PSD estimating unit 950), non-negative constraint of PSD, and a constraint or convex cost term based on structure of sound source, are used in conjunction. Also, the constraints and convex cost terms in (2) may be further based on harmonic structure of sound.

2: Application Example

A specific example of the optimization problem, and an optimization algorithm for solving this specific example, will be described here.

A problem defined using the constraints and convex cost terms of (b), (c-1), (c-3), and (d-2) will be considered as a specific example of the optimization problem.

[Math. 27]

$$\inf_{u,v} F_1(u) + F_2(v)$$

s.t.

$$Au = v,$$

$$Bu = c,$$

$$u \geq 0$$

$$F_1(u) = \frac{1}{2}\left\|W^{\frac{1}{2}}(u - \zeta)\right\|_2^2$$

$$F_2(v) = \mu\|v\|_1 + \frac{\rho}{2}\|v - \hat{v}_{\varphi_S}\|_2^2$$

Here, $\mu$, $\rho(\in R^+)$ are weighting coefficients. Also, $\zeta$ is defined by the following Expressions.

[Math. 28]

$$\zeta = [\zeta_S^T, \hat{\varphi}_{IN}^T, \hat{\varphi}_{BN}^T]^T$$

$$\zeta_S = [\hat{\varphi}_{S-Low}^T, c_{Mid}^T, \hat{\varphi}_{S-High}^T]^T$$

-continued $$\hat{\varphi}_{S-Low} = [\hat{\varphi}_S(0, \tau), \hat{\varphi}_S(1, \tau), \cdots, \hat{\varphi}_S(\omega_L - 1, \tau)]^T$$

$$c_{Mid} = [c(\omega_L, \tau), c(\omega_L + 1, \tau), \cdots, c(\omega_H, \tau)]^T$$

$$\hat{\varphi}_{S-High} = [\hat{\varphi}_S(\omega_H + 1, \tau), \hat{\varphi}_S(\omega_H + 2, \tau), \cdots, \hat{\varphi}_S(\Omega - 1, \tau)]^T$$

Also, with $\Lambda(\in R^{\Omega \times \Omega})$ as a frequency weighting matrix $\Lambda_w$, and $I(\in R^{\Omega \times \Omega})$ as an identity matrix, matrices A and B, vectors c and $\hat{v}_{\varphi\_S}$, and matrices W and $W^{1/2}$, are given by the following Expressions.

[Math. 29]

$$A = [\Lambda \ 0 \ 0],$$

$$B = [I \ I \ I]$$

$$c = \varphi_{\gamma S_0},$$

$$\hat{v}_{\varphi_S} = A\hat{\varphi}$$

$$W = \begin{bmatrix} w_S I & 0 & 0 \\ 0 & w_{IN} I & 0 \\ 0 & 0 & w_{BN} I \end{bmatrix},$$

$$W^{\frac{1}{2}} = \begin{bmatrix} \sqrt{w_S} I & 0 & 0 \\ 0 & \sqrt{w_{IN}} I & 0 \\ 0 & 0 & \sqrt{w_{BN}} I \end{bmatrix}$$

$$(w_S, w_{IN}, w_{BN} \in R^+)$$

Here, the $\gamma_{Mid}$ used for defining the convex cost term in (d-2) is $\gamma_{Mid} = w_S^{1/2}$.

The cost function $F_1 + F_2$ in this optimization problem uses, besides a latent variable u, an auxiliary variable v of the latent variable u. Also, constraints of this optimization problem are linear constraints regarding the variables u and v, i.e., Au=v, Bu=c, u≥0. Note that $F_1$ and $F_2$ are both convex functions.

Solving a dual problem instead of solving the above optimization problem will be considered. The dual problem is shown in the following Expression.

[Math. 30]

$$\sup_{p,q,r \geq 0} \inf_{u,v} F_1(u) + F_2(v) + <p, v - Au> + <q, c - Bu> - <r, u>$$

By organizing dual variables p, q, and r as $\zeta = [p, q, r]^T$, the dual problem can be expressed as in the following Expression.

[Math. 31]

$$\inf_{\xi} \underbrace{F_1^*(A^T p + B^T q + r) - q^T c}_{G_1(\xi)} + \underbrace{F_1^*(-p) + I_{(r \geq 0)}(r)}_{G_2(\xi)}$$

Here, $F_1^*$ and $F_2^*$ are convex conjugate functions of $F_1$ and $F_2$, and are expressed as in the following Expressions.

[Math. 32]

$$F_1^*(A^T p + B^T q + r) = \sup_u (< u, A^T p + B^T q + r > -F_1(u))$$

$$F_2^*(-p) = \sup_v (< v, -p > -F_2(v))$$

Also, $I_{(r \geq 0)}$ (r) is an indicator function that guarantees the non-negativity of r.

[Math. 32]

$$I_{(r \geq 0)}(r) = \begin{cases} 0 & (r_\omega \geq 0, \omega \in \{0, \cdots, \Omega - 1\}) \\ +\infty & \text{(otherwise)} \end{cases}$$

It can be seen from the above that the cost function of the dual problem is expressed as the sum of two closed proper convex functions $G_1$ and $G_2$.

In order to realize sound source enhancement in real time, an algorithm is necessary that solves the above dual problem $\inf_\zeta G_1(\zeta) + G_2(\zeta)$ at high speeds. The Bregman monotone operator splitting (B-MOS) disclosed in reference NPL 1 is used here.

(Reference NPL 1: K. Niwa and W. B. Kleijn, "Bregman monotone operator splitting", https://arxiv.org/abs/1807.04871, 2018.)

Specifically, a Bregman-Peaceman-Rachfold (B-P-R) type optimization solver is used. The B-P-R type optimization solver uses a recursive update expression obtained from a fixed-point condition where $0 \in \partial G_1(\zeta) + \partial G_2(\zeta)$.

[Math. 34]

$$\xi \in C_2 C_1(\xi)$$

This Expression is configured using the following D-Cayley operator $C_i$.

$$C_i = (I - (\nabla D)^{-1} \partial G_i)(I + (\nabla D)^{-1} \partial G_i)^{-1} \quad \text{[Math. 35]}$$
$$= 2R_i - I \quad (i = 1, 2)$$

Here, $\cdot^{-1}$ represents inverse mapping. Also, D is a function used for defining Bregman divergence. A function that satisfies $\nabla D(0) = 0$, and in which $\nabla D$ is a strongly convex function that is differentiable, is used as the function D.

Also, $R_i$ and I are respectively a D-resolvent operator and an identity operator, and the D-resolvent operator $R_i$ is given by the following Expression.

$$R_i = (I + (\nabla D)^{-1} \partial G_i)^{-1} \quad (i = 1, 2) \quad \text{[Math. 36]}$$

The optimization algorithm shown in FIG. 3 is obtained from the above update expression. It can be seen from FIG. 3 that dual variables $\tilde{p} = \nabla D_p(p)$, $\tilde{q} = \nabla D_q(q)$, and $\tilde{r} = \nabla D_r(r)$, obtained by nonlinear transform of (primary) variable u, auxiliary variable v, and dual variables p, q, and r, respectively, are alternately updated. Note that strongly convex functions $D_p$, $D_q$, and $D_r$ are each given by the following Expressions.

[Math. 37]

$$D_p(p) = \frac{1}{2} \langle AW^{-1} A^T p, p \rangle$$

$$D_q(q) = \frac{1}{2} \langle BW^{-1} B^T q, q \rangle$$

$$D_r(r) = \frac{1}{2} \langle W^{-1} r, r \rangle$$

Accordingly, $\nabla D_p$, $\nabla D_q$, and $\nabla D_r$ are respectively given by the following Expressions.

$$\nabla D_p = AW^{-1} A^T \quad \text{[Math. 38]}$$
$$\nabla D_q = BW^{-1} B^T$$
$$\nabla D_r = W^{-1}$$

Accordingly, the gradients of the strongly convex functions $D_p$, $D_q$, and $D_r$ at zero are 0.

Also, Bregman divergence is used in the regularization term of the proximal operator in updating of the primary variable u in the algorithm in FIG. 3 (see following Expression).

$$J_{D_p^\bullet}(Au \| \tilde{p}) = D_p^\bullet(Au) - D_p^\bullet(\tilde{p}) - \langle \nabla D_p^\bullet(\tilde{p}), Au - \tilde{p} \rangle \quad \text{[Math. 39]}$$

Here, $D_p^\bullet = D_p^{-1}$.

Generally, $\nabla (D^{-1}) = (\nabla D)^{-1}$ holds with respect to the differential operator of the strongly convex function D, and accordingly $\nabla D_p^\bullet = \nabla(D_p^{-1}) = (\nabla D_p)^{-1} = (AWA^T)^*$ holds. This is the same for $\nabla D_q^\bullet$ and $\nabla D_r^\bullet$ as well. Accordingly, $\nabla D_p^\bullet$, $\nabla D_q^\bullet$, and $\nabla D_r^\bullet$ are given by the following Expressions.

$$\nabla D_p^\bullet = (A W^{-1} A^T)^* \quad \text{[Math. 40]}$$
$$\nabla D_q^\bullet = (B W^{-1} B^T)^*$$
$$\nabla D_r^\bullet = (W^{-1})^*$$

In the algorithm in FIG. 3, T is a constant that represents an iteration count, and needs to be set to a small value when processing in real time.

The optimization problem defined using the constraints and the convex cost terms of (b), (c-1), (c-3), and (d-2) has been considered above. However, depending on the constraints and convex cost terms used to define the optimization problem, formulation may be performed by the following Expression, under linear constraints relating to the variable u.

[Math. 41]

$$\inf_u F_1(u)$$

Here, the cost function $F_1$ is a convex function.

In this case, the optimization problem is formulated without using the auxiliary variable of u, and can be solved relatively easily,

First Embodiment

Figure 6:
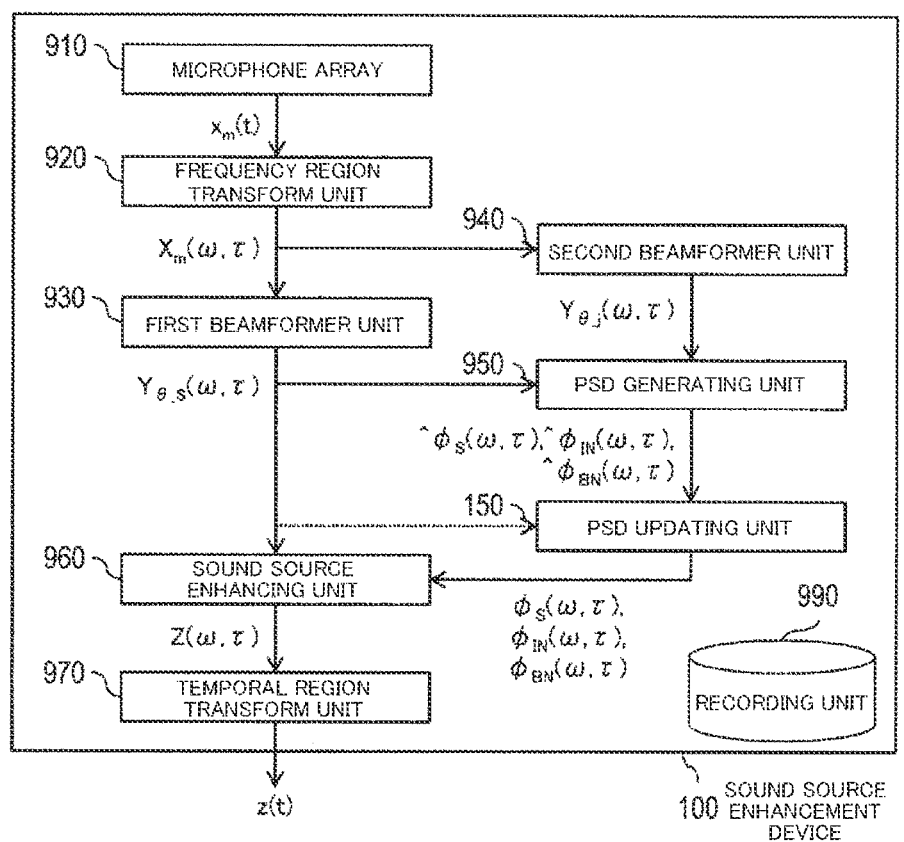
FIG. 6 is a block diagram illustrating a configuration of a sound source enhancement device 100.
Figure 7:
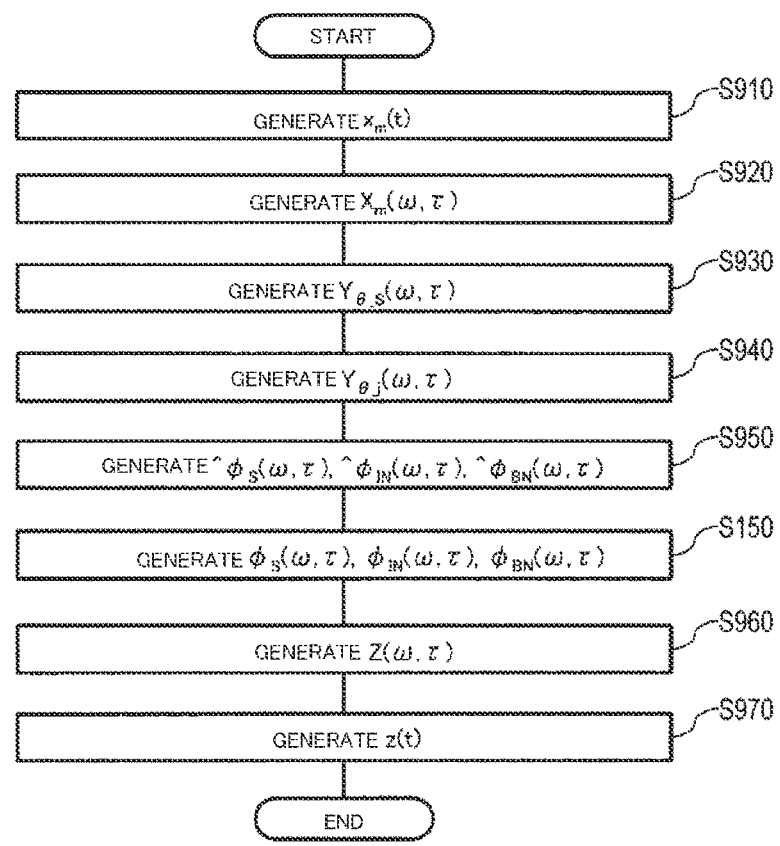
FIG. 7 is a flowchart showing operations of the sound source enhancement device 100.

A sound source enhancement device 100 will be described below with reference to FIG. 6 and FIG. 7. FIG. 6 is a block diagram illustrating a configuration of the sound source enhancement device 100. FIG. 7 is a flowchart showing operations of the sound source enhancement device 100. The sound source enhancement device 100 includes the microphone array 910, the frequency region transform unit 920, the first beamformer unit 930, the second beamformer unit 940, the PSD Generating unit 950, a PSD updating unit 150, the sound source enhancing unit 960, the temporal region transform unit 970, and the recording unit 990, as illustrated in FIG. 6. The sound source enhancement device 100 differs from the sound source enhancement device 900 only with respect to the point of further including the PSD updating unit 150.

Operations of the sound source enhancement device 100 will be described following FIG. 7.

In S910, the microphone array 910, which is made up of M (where M is an integer of 2 or greater) microphone elements, generates and outputs temporal region observation signals $x_m(t)$ (m=0, 1, ..., M−1) collected by a microphone element m.

In S920, the frequency region transform unit 920 takes the temporal region observation signals $x_m(t)$ (m=0, 1, ..., M−1) Generated in S910 as input and, and transforms each of the temporal region observation signals $x_m(t)$ (m=0, 1, ..., M−1) into frequency region, thereby generating frequency region observation signals $X_m(\omega, \tau)$ (m=0, 1, ..., M−1), which are output.

In S930, the first beamformer unit 930 takes the frequency region observation signals $X_m(\omega, \tau)$ (m=0, 1, ..., M−1) generated in S920 as input, and generates and outputs enhanced signals $Y_{\theta\_S}(\omega, \tau)$ of a sound source at a target sound direction-of-arrival $\theta_S$ (hereinafter referred to as first enhanced. signals $Y_{\theta\_S}(\omega, \tau)$) by performing linear filtering of the frequency region observation signals $X_m(\omega, \tau)$ (m=0, 1, ..., M−1).

In S940, the second beamformer unit 940 takes the frequency region observation signals $X_m(\omega, \tau)$ (m=0, 1, ..., M−1) generated in S920 as input, and generates and outputs L−1 (where L−1 is an integer that is K or greater) enhanced signals $Y_{\theta\_j}(\omega, \tau)$=j=1, ... L−1) of sound sources of directions $\theta_j$ other than the target sound direction-of-arrival (hereinafter referred to as second enhanced signals $Y_{\theta\_j}(\omega, \tau)$) by performing linear filtering of the frequency, region observation signals $X_m(\omega, \tau)$ (m=0, 1, ..., N−1).

In S950, the PSD generating unit 950 takes the first enhanced signals $Y_{\theta\_S}(\omega, \tau)$ generated in S930 and the second enhanced signals $Y_{\theta\_j}(\omega, \tau)$ (j=1, ..., L−1) generated in S940 as input, and generates and outputs target sound PSD $\hat{\varphi}_S(\omega, \tau)$, interference noise PSD $\hat{\varphi}_{IN}(\omega, \tau)$, and background noise PSD $\hat{\varphi}_{BN}(\omega, \tau)$, using the first enhanced signals $Y_{\theta\_S}(\omega, \tau)$ and the second enhanced signals $Y_{\theta\_e}(\omega,\tau)$ (j=1, ..., L−1). Note that although the ^ is affixed here to the signs representing the target sound PSD, the interference noise PSD, and the background noise PSD, the operations of the PSD generating unit 950 in S950 are the same as those described by way of FIG. 3 and FIG. 4 in the <Technical Background>.

Hereinafter, the target sound PSD $\hat{\varphi}_S(\omega, \tau)$, the interference noise PSD $\hat{\varphi}_{IN}(\omega, \tau)$, and the background noise PSD $\hat{\varphi}_{BN}(\omega, \tau)$ will be referred to as target sound PSD input value $\hat{\varphi}_S(\omega, \tau)$, interference noise PSD input value $\hat{\varphi}_{IN}(\omega, \tau)$, and background noise PSD input value $\hat{\varphi}_{BN}(\omega, \tau)$. Also, $u_S$ is a variable representing the target sound PSD, $u_{IN}$ is a variable representing the interference noise PSD, and $u_{BN}$ is a variable representing the background noise PSD.

In S150, the PSD updating unit 150 takes the target sound PSD input value $\hat{\varphi}_S(\omega, \tau)$, the interference noise PSD input value $\hat{\varphi}_{IN}(\omega, \tau)$ and the background noise PSD input value $\hat{\varphi}_{BN}(\omega, \tau)$, generated in S950, as input, and solves the optimization problem for the cost function relating to the variable $u_S$, the variable $u_{IN}$, and the variable $u_{BN}$, thereby generating and outputting a target sound PSD output value $\varphi_S(\omega, \tau)$, an interference noise PSD output value $\hat{\varphi}_{IN}(\omega, \tau)$, and a background noise PSD output value $\hat{\varphi}_{BN}(\omega, \tau)$. That is to say, the PSD updating unit 150 is a component that solves the optimization problem described in the <Technical Background>. This optimization problem is an optimization problem of a cost function relating to the variable $u_S$, the variable $u_{IN}$, and the variable $u_{BN}$, and is defined using one of (1) constraints based on the difference in sound source enhancement characteristics of the beamformer in accordance with the degree of inclusion of the target sound, with regard to the PSD of signals beamformed in target sound direction-of-arrival, (2) convex cost terms based on the difference in sound source enhancement characteristics of the beamformer in accordance with the degree of inclusion of the target sound, with regard to the PSD of signals beamformed in target sound direction-of-arrival, (3) constraints based on the difference in sound source enhancement characteristics of the beamformer in the frequency direction, with regard to the PSD of signals beamformed in target sound direction-of-arrival, and (4) convex cost terms based on the difference in sound source enhancement characteristics of the beamformer in the frequency direction, with regard to the PSD of signals beamformed in target sound direction-of-arrival, at the least.

Examples of the constraints and convex cost terms in (1) through (4) will be described below. For example, the arrangement described below can be used as a convex cost term based on difference in sound source enhancement characteristics of the beamformer in accordance with the degree of inclusion of the target sound, in (2). Here, this convex cost term is derived on the basis of the assumption that the more dominant the target sound is, the closer the value of the variable $u_S$ will be to the PSD estimation. value c of enhanced signals of the sound source at the target sound direction-of-arrival by the beamformer, or to the target sound PSD input value $\hat{\varphi}_S(\omega, \tau)$ obtained on the basis of enhancement of the sound source at the target sound direction-of-arrival by the beamformer. Specifically, this is the convex cost term defined in Expression (1) and Expression (1)'. Note that the target sound direction-of-arrival by the beamformer is the target sound direction-of-arrival $\theta_S$.

Also, for example, the convex cost term based on the difference in sound source enhancement characteristics of the beamformer in the frequency direction in (4) is a convex cost term that is derived on the basis of the assumption that the value of the variable $u_S$ is close to the PSD estimation value c of enhanced signals of the sound source at the target sound direction-of-arrival by the beamformer, or to the target sound PSD input value $\hat{\varphi}_S(\omega, \tau)$ obtained on the basis of enhancement of the sound source at the target sound direction-of-arrival by the beamformer, in the midrange frequency bands. Specifically, this is the convex cost term defined in Expression (2) or in Expression (2)'.

Also, for example, the convex cost term based on the difference in sound source enhancement characteristics of the beamformer in the frequency direction in (4) is derived following the description below. Here, this convex cost term is derived under the assumption that the value of the variable $u_S$ is close to the PSD estimation value c of enhanced signals of the sound source at the target sound direction-of-arrival by the beamformer, regarding which at least one of low-frequency bands and high-frequency bands is substituted by PSD estimation values of midrange-frequency bands, or to the target sound PSD input value $\hat{\varphi}_S(\omega, \tau)$ obtained on the basis of enhancement of the sound source at the target sound direction-of-arrival by the beamformer, regarding which at least one of low-frequency bands and high-frequency bands is substituted by target sound PSD input values of midrange-frequency bands. Specifically, this is the convex cost term defined in Expression (3) or in Expression (3)'.

Also, this optimization problem of the cost function, relating to variable $u_S$, variable $u_{IN}$, and variable $u_{BN}$ can be formulated as a problem in which variable $u=[u_S^T, u_{IN}^T, u_{BN}^T]^T$, and v is an auxiliary variable of the variable u, and $\inf_{u,v} F_1(u)+F_2(v)$ (where $F_1$ and $F_2$ are each a convex function configuring a cost function) is solved under linear constraints relating to the variables u and v. Now, the linear constraints relating to the variables u and v include constraints based on difference in sound source enhancement characteristics of the beamformer in accordance with the degree of inclusion of the target sound, with regard to the PSD of the signals beamformed in the target sound direction-of-arrival, or constraints based on difference in sound source enhancement characteristics of the beamformer in frequency direction with regard to the PSD of the signals beamformed in the target sound direction-of-arrival. Alternatively, regarding the linear constraints, the cost function $F_1(u)+F_2(v)$ includes convex cost terms based on difference in sound source enhancement characteristics of the beamformer in accordance with the degree of inclusion of the target sound, with regard to the PSD of the signals beamformed in the target sound direction-of-arrival, or convex cost terms based on difference in sound source enhancement characteristics of the beamformer in frequency direction with regard to the PSD of the signals beamformed in the target sound direction-of-arrival.

Note that depending on the constraints and the convex cost terms used to define the optimization problem, there are cases in which the optimization problem is formulated as a problem in which the above problem is simplified. Specifically, with $u=[u_S^T, u_{IN}^T, u_{BN}^T]^T$, the optimization problem of the cost function relating to the variable $u_S$, the variable $u_{IN}$, and the variable $u_{BN}$ can be formulated as a problem solving $\inf_u F_1(u)$ (where $F_1$ is a convex cost function) under linear constraints relating to the variable u. Now, the linear constraints relating to the variable u include constraints based on difference in sound source enhancement characteristics of the beamformer in accordance with the degree of inclusion of the target sound, with regard to the PSD of the signals beamformed in the target sound direction-of-arrival, or constraints based on difference in sound source enhancement characteristics of the beamformer in frequency direction with regard to the PSD of the signals beamformed in the target sound direction-of-arrival. Alternatively, regarding the linear constraints, the cost function $F_1(u)$ includes convex cost terms based on difference in sound source enhancement characteristics of the beamformer in accordance with the degree of inclusion of the target sound, with regard to the PSD of the signals beamformed in the target sound direction-of-arrival, or convex cost terms based on difference in sound source enhancement characteristics of the beamformer in frequency direction with regard to the PSD of the signals beamformed in the target sound direction-of-arrival.

An example of the optimization problem formulated using the auxiliary variable v of the variable u as well will be described below.

Linear constraints regarding the variables u and v are given by the following Expression.

[Math. 42]

$$Au = v,$$
$$Bu = c,$$
$$u \geq 0$$

(where $A=[\Lambda\ 0\ 0]$, $B=[I, I, I]$, c is the PSD estimation value of enhanced signals of the sound source at the target sound direction-of-arrival $\theta_S$, $\Lambda(\in R^{\Omega \times \Omega})$ is the frequency weighting matrix $\Lambda_w$, $I(\in R^{\Omega \times \Omega})$ is an identity matrix, and $\Omega$ is the number of frequency bands)

Also, $F_1(u)$ and $F_2(v)$ are each given from the following Expressions.

$$F_1(u) = \frac{1}{2}\left\|W^{1/2}(u-\zeta)\right\|_2^2 \quad \text{[Math. 43]}$$

$$F_2(v) = \mu\|v\|_1 + \frac{\rho}{2}\|v - \hat{v}_{\varphi_S}\|_2^2 \text{ where}$$

$$W^{1/2} = \begin{bmatrix} \sqrt{w_S}I & 0 & 0 \\ 0 & \sqrt{w_{IN}}I & 0 \\ 0 & 0 & \sqrt{w_{BN}}I \end{bmatrix} (w_S, w_{IN}, w_{BN} \in R^+), \quad \text{[Math. 44]}$$

$$\zeta = [\zeta_S^T, \hat{\varphi}_{IN}^T, \hat{\varphi}_{BN}^T]^T$$

$$\zeta_S = [\hat{\varphi}_{S-Low}^T, c_{Mid}^T, \hat{\varphi}_{S-High}^T]^T$$

$$\hat{\varphi}_{S-Low} = [\hat{\varphi}_S(0, \tau), \hat{\varphi}_S(1, \tau), \dots, \hat{\varphi}_S(\omega_L - 1, \tau)]^T$$

$$c_{Mid} = [c(\omega_L, \tau), c(\omega_L + 1, \tau), \dots, c(\omega_H, \tau)]^T$$

$$\hat{\varphi}_{S-High} = [\hat{\varphi}_S(\omega_H + 1, \tau), \hat{\varphi}_S(\omega_H + 2, \tau), \dots, \hat{\varphi}_S(\Omega - 1, \tau)]^T$$

$$\hat{\varphi} = [\hat{\varphi}_S^T, \hat{\varphi}_{IN}^T, \hat{\varphi}_{BN}^T]^T,$$

$$\hat{v}_{\hat{\varphi}_S} = A\hat{\varphi},$$

$\mu$, $\rho(\in R^+)$ are weighting coefficients, and $0 < \omega_L < \omega_H < \Omega - 1$)

Figure 8:
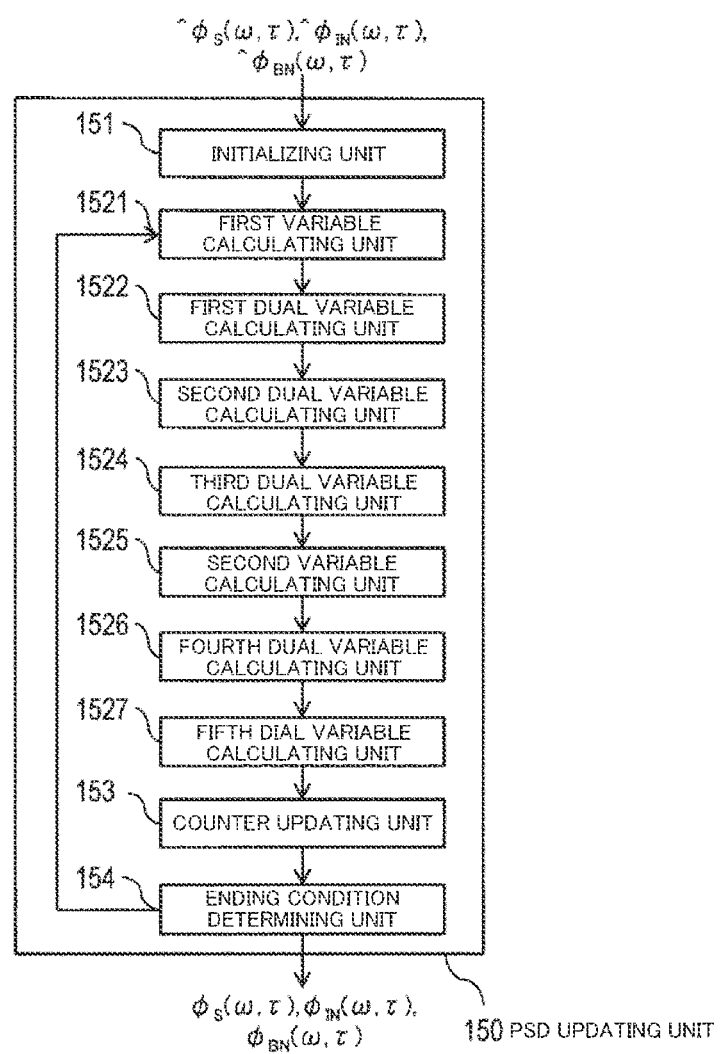
FIG. 8 is a block diagram illustrating a configuration of a PSD updating unit 150.
Figure 9:
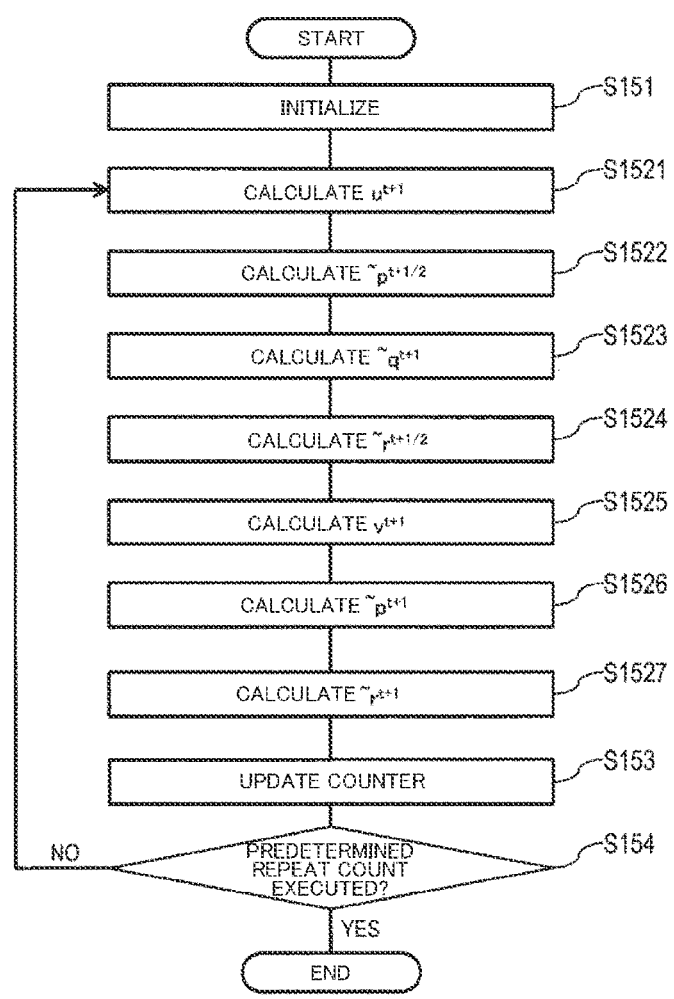
FIG. 9 is a flowchart showing operations of the PSD updating unit 150.

The PSD updating unit 150 that solves the optimization problem will be described below with reference to FIG. 8 and FIG. 9. FIG. 8 is a block diagram illustrating a configuration of the PSD updating unit 150. FIG. 9 is a flowchart showing operations of the PSD updating unit 150. The PSD updating unit 150 includes an initializing unit 151, a first variable calculating unit 1521, a first dual variable calculating unit 1522, a second dual variable calculating unit 1523, a third dual variable calculating unit 1524, a second variable calculating unit 1525, a fourth dual variable calculating unit 1526, a fifth dial variable calculating unit 1527, a counter updating unit 153, and an ending condition determining unit 154, as illustrated in FIG. 8.

The operations of the PSD updating unit 150 will be described following FIG. 9. Here, functions $D_p^{\bullet}$, $D_q^{\bullet}$, and $D_r^{\bullet}$, and dual variables ˜p, ˜q, and ˜r, defined in the following Expressions regarding the dual variables p, q, and r, are used.

[Math. 45]
$$D_p^{\bullet} = D_p^{-1}, D_q^{\bullet} = D_q^{-1}, D_r^{\bullet} = D_r^{-1}$$
$$\tilde{p} = \nabla D_p(p), \tilde{q} = \nabla D_q(q), \tilde{r} = \nabla D_r(r)$$

In S151, the initializing unit 151 initializes a counter t. Specifically, the initializing unit 151 initializes t to t=0. The initializing unit 151 also initializes the dual variables ˜p, ˜q, and ˜r. Specifically, ˜p⁰, ˜q⁰, and ˜r⁰ are set as initial values of the dual variables ˜p, ˜q, and ˜r (the result of having updated the dual variables ˜p, ˜q, and ˜r for the 0'th time).

In S1521, the first variable calculating unit 1521 calculates $u^{t+1}$, which is the result of updating the variable u for a t+1'th time, by the following Expression.

[Math. 46]
$$u^{t+i} = \operatorname*{argmin}_u \left( F_1(u) + J_{D_p^{\bullet}}(Au \| \tilde{p}^t) + J_{D_q^{\bullet}}(Bu \| \tilde{q}^t) + J_{D_r^{\bullet}}(u \| - \tilde{r}^t) \right)$$

In S1522, the first dual variable calculating unit calculates $\tilde{p}^{t+1/2}$, which is the intermediate updating result of the dual variable ˜p for the t+1'th time, by the following Expression.

[Math. 47]
$$\tilde{p}^{t+1/2} = \tilde{p}^t - 2Au^{t+1}$$

In S1523, the second dual variable calculating unit calculates $\tilde{q}^{t+1}$, which is the result of updating the dual variable ˜q for the t+1'th time, by the following Expression.

[Math. 48]
$$\tilde{q}^{t+1} = \tilde{q}^t - 2(Bu^{t+1} - c)$$

In S1524, the third dual variable calculating unit calculates $\tilde{r}^{t+1/2}$, which is an intermediate updating result of the dual variable ˜r for the t+1'th time, by the following Expression.

[Math. 49]
$$\tilde{r}^{t+1/2} = \tilde{r}^t - 2u^{t+1}$$

In S1525, the second variable calculating unit calculates $v^{t+1}$, which is the result of updating the auxiliary variable v for the t+1'th time, by the following Expression.

[Math. 50]
$$v^{t+1} = \operatorname*{argmin}_v \left( F_2(v) + J_{D_p^{\bullet}}(v \| - \tilde{p}^{t+1/2}) \right)$$

In S1526, the fourth dual variable calculating unit calculates $\tilde{p}^{t+1}$, which is the result of updating the dual variable ˜p for the t+1'th time, by the following Expression.

[Math. 51]
$$\tilde{p}^{t+1} = \tilde{p}^{t+1/2} + 2v^{t+1}$$

In S1527, the fifth dual variable calculating unit sets $\tilde{r} = [\tilde{r}_1^T, \tilde{r}_2^T, \tilde{r}_3^T]^T$, and calculates $\tilde{r}^{t+1}$, which is the result of updating the dual variable ˜r for the t+1'th time, by the following Expression.

[Math. 52]
$$\tilde{r}_i^{t+1} = \begin{cases} \tilde{r}_i^{t+1/2} (\text{if } \tilde{r}_i^{t+1/2} \geq 0) \\ -\tilde{r}_i^{t+1/2} (\text{otherwise}) \end{cases} (i = 1, 2, 3)$$

In S153, the counter updating unit 125 increments the counter t by 1. Specifically, t←t+1 is set.

In S154, in a case where the counter t has reached a predetermined update count T (where T is a value that is an integer of 1 or greater, and that has been set taking real-time nature into consideration) (i.e., when t>T−1 is reached, and ending conditions are satisfied), the ending condition determining unit 154 outputs a value $u^T$ of the variable u at that time, and ends processing. Otherwise, the flow returns to the processing of S1521. That is to say, the PSD updating unit 150 repeats the processing of S1521 through S154.

In S960, the sound source enhancing unit 960 takes, as input, the first enhanced signals $Y_{\theta\_S}(\omega, \tau)$ generated in S930, and the target sound PSD output value $\varphi_S(\omega, \tau)$, interference noise PSD output value $\varphi_{IN}(\omega, \tau)$, and background noise PSD output value $\varphi_{BN}(\omega, \tau)$, generated in S150, and uses the first enhanced signals $Y_{\theta\_S}(\omega, \tau)$, target sound PSD output value $\varphi_S(\omega, \tau)$, interference noise PSD output value $\varphi_{IN}(\omega, \tau)$, and background noise PSD output value $\varphi_{BN}(\omega, \tau)$, to generate and output frequency region target sound signals $Z(\omega, \tau) \in C$.

In S970, the temporal region transform unit 970 takes the frequency region target sound signals $Z(\omega, \tau)$ generated in S960 as input, and generates and outputs temporal region target sound frequency region observation signals $z(t) \in R$ by transforming the frequency region target sound signals $Z(\omega, \tau)$ into the temporal region.

Figure 10:
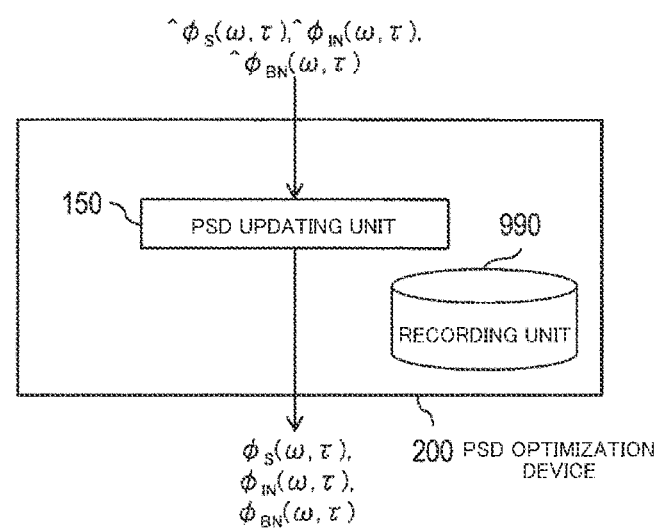
FIG. 10 is a block diagram illustrating a configuration of a PSD optimization device 200.

Note that the PSD updating unit 150 can be configured as a standalone device (hereinafter referred to as PSD optimization device 200). FIG. 10 is a block diagram illustrating the configuration of the PSD optimization device 200. The PSD optimization device 200 includes the PSD updating unit 150 and the recording unit 990, as illustrated in FIG. 10.

According to the invention of the present embodiment, taking beamformer characteristics into consideration enables sound source enhancement capabilities to be efficiently improved in a configuration using a beamformer to suppress interference noise.

Notes

Figure 11:
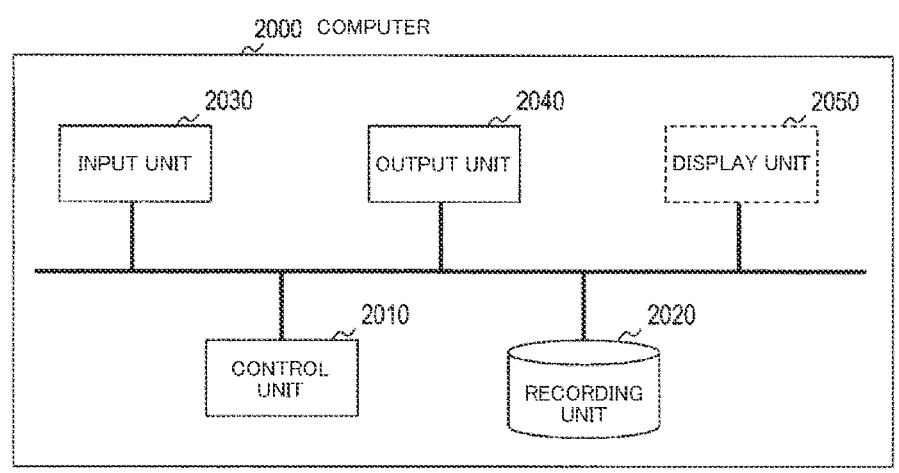
FIG. 11 is a diagram illustrating an example of a functional configuration of a computer that realizes devices in an embodiment of the present invention.

FIG. 11 is a diagram illustrating an example of the functional configuration of a computer that realizes the above-described devices. The processing of the above-described devices can be realized by a recording unit 2020 reading in a program for causing the computer to function as the above-described devices, and run by a control unit 2010, an input unit 2030, an output unit 2040, and so forth.

The device according to the present invention, as a standalone hardware entity for example, has an input unit to which a keyboard or the like can be connected, and an output unit to which a liquid crystal display or the like can be connected, a communication unit connectable to a communication device (e.g., communication cable) that can communicate externally from the hardware entity, a CPU (Central Processing Unit, may have cache memory, registers, etc.), RAM and ROM that are memory, an external storage device that is a hard disk, and a bus that connects the input unit, output unit, communication unit, CPU, RAM, ROM, and external storage device so as to be capable of exchanging data therebetween. Also, a device (drive) that can read from and write to a recording medium such as a CD-ROM or the like, and so forth, may be provided to the hardware entity as necessary. Examples of physical entities having such hardware resources include a general purpose computer or the like.

The external storage device of the hardware entity stores programs necessary for realizing the above-described functions, and data and so forth necessary for processing of the programs (this is not limited to the external storage device, and programs may be stored in ROM that is a read-only storage device, for example). Data and so forth obtained by processing performed by these programs is stored in RAM, the external storage device, and so forth, as appropriate.

In the hardware entity, the programs stored in The external storage device (or ROM or the like) and data necessary for processing of the programs are read into memory as necessary, and subjected to interpreting processing by the CPU as appropriate. As a result, the CPU realizes predetermined functions (the components described above as so-and-so unit, so-and-so means, and so forth).

The present invention is not limited to the above-described embodiments, and modifications can be made as appropriate without departing from the essence of the present invention. Also, processing described in the above embodiments is not restricted to being executed in the order of the time sequence described therein, and may be executed in parallel or individually, in accordance with the processing capabilities of the device executing processing, or as necessary.

In a case of realizing the processing functions at the hardware entity (device of the present invention) described in the above embodiments by a computer, the contents of processing for the function which the hardware entity should have are described as a program, as mentioned earlier. Executing this program on a computer realizes the processing functions of the above hardware entity on the computer.

The program describing these contents of processing can be recorded in a computer-readable recording medium. Any computer-readable recording medium may be used, such as magnetic recording devices, optical discs, opto-magnetic recording media, semiconductor memory, and so forth, for example. Specifically, examples of a magnetic recording device that can be used include hard disk devices, flexible disks, magnetic tape, and so forth. Examples of optical discs include DVD (Digital Versatile Disc), DVD-RAM (Random Access Memory), CD-ROM (Compact Disc Read Only Memory), CD-R (Recordable)/RW (ReWritable), and so forth, examples of opto-magnetic recording media include MO (Magneto-Optical disc) and so forth, and examples of semiconductor memory include EEP-ROM (Electronically Erasable and Programmable-Read Only Memory) and so forth.

Also, distribution of this program is performed by sales, transfer, lending, and so forth of a transportable recording medium such as a DVD, CD-ROM, or the like, in which the program is recorded, for example. Further, a configuration for distribution of the program may be made by storing the program in a storage device of a server computer, and transferring the program from the server computer to other computers via a network.

A computer that executes such a program first stores the program recorded in a transportable recording medium or the program transferred from a server computer in its own storage device to begin with, for example. Then, at the time of executing the processing, the computer reads the program stored in its own recording device, and executes processing following the program that has been read out. As a separate form of executing the program, the computer may directly read the program from the transportable recording medium and execute processing following the program. Further, each time the program is transferred from the server computer to this computer, the computer may successively execute processing following the program that has been received. Also, a configuration may be made where the above-described processing is executed by a so-called ASP (Application Service Provider) type service, where the program is not transferred from the server computer to this computer, and the processing functions are realized just by instructions for execution and acquisition of results. Note that the program according to this form includes information provided for processing by electronic computers that is equivalent to programs (data or the like that is not direct instructions to a computer but has a nature of defining processing of the computer).

Also, in this form, the hardware entity is configured by executing a predetermined program on a computer, but at least part of these contents of processing may be realized by hardware.

The above description of the embodiment of the present invention has been given for exemplification and description. The description is not intended to be exhaustive, nor is the invention intended to be strictly limited to the disclosed form. Modifications and variations can be made from the above teachings. The embodiment has been selectively expressed to provide the best exemplification of the principles of the present invention, and to enable one skilled in the art to carry out the present invention in various embodiments that are well thought out to be applied to practical use, with various modifications added thereto. All such modifications and variations are within the scope of the present invention set forth in the attached Claims, as interpreted according to the breadth justly and legally fairly imparted thereto.

The invention claimed is:

1. A power spectral density (PSD) optimization device including a PSD updater that, with $u_S$ as a variable representing a target sound PSD, $u_{IN}$ as a variable representing an interference noise PSD, and $u_{BN}$ as a variable representing a background noise PSD, takes a target sound PSD input value $\hat{\varphi}_S(\omega, \tau)$, an interference noise PSD input value $\hat{\varphi}_{IN}(\omega, \tau)$, and a background noise PSD input value $\hat{\varphi}_{BN}(\omega, \tau)$ as input, and generates a target sound PSD output value $\varphi_S(\omega, \tau)$, an interference noise PSD output value $\varphi_{IN}(\omega, \tau)$, and a background noise PSD output value $\varphi_{BN}(\omega, \tau)$, by solving an optimization problem for a cost function relating to the variable $u_S$, the variable $u_{IN}$, and the variable $u_{BN}$, wherein the optimization problem for the cost function is defined using at least one of:

a constraint based on difference in sound source enhancement characteristics of a beamformer in accordance with a degree of inclusion of a target sound, with regard to a PSD of signals beamformed in a target sound direction-of-arrival,
a convex cost term based on the difference in sound source enhancement characteristics of the beamformer in accordance with the degree of inclusion of the target sound, with regard to the PSD of signals beamformed in the target sound direction-of-arrival,
a constraint based on the difference in sound source enhancement characteristics of the beamformer in a frequency direction, with regard to the PSD of signals beamformed in the target sound direction-of-arrival, and
a convex cost term based on the difference in sound source enhancement characteristics of the beamformer in the frequency direction, with regard to the PSD of signals beamformed in the target sound direction-of-arrival.

2. The PSD optimization device according to claim 1, wherein the convex cost term based on the difference in sound source enhancement characteristics of the beamformer in accordance with the degree of inclusion of the target sound is a convex cost term that is derived on the basis of an assumption that the more dominant the target sound is, the closer the value of the variable $u_S$ will be to a PSD estimation value c of enhanced signals of the sound source at the target sound direction-of-arrival by the beamformer, or to the target sound PSD input value $\hat{\varphi}_S(\omega, \tau)$ obtained on the basis of enhancement of the sound source at the target sound direction-of-arrival by the beamformer.

3. The PSD optimization device according to claim 1, wherein the convex cost term based on the difference in sound source enhancement characteristics of the beamformer in the frequency direction is a convex cost term that is derived on the basis of an assumption that the value of the variable $u_S$ is close to a PSD estimation value c of enhanced signals of the sound source at the target sound direction-of-arrival by the beamformer, or to the target sound PSD input value $\hat{\varphi}_S(\omega, \tau)$ obtained on the basis of enhancement of the sound source at the target sound direction-of-arrival by the beamformer, in a midrange-frequency band.

4. The PSD optimization device according to claim 1, wherein the convex cost term based on the difference in sound source enhancement characteristics of the beamformer in the frequency direction is a convex cost term that is derived on the basis of an assumption that the value of the variable $u_S$ is close to a PSD estimation value c of enhanced signals of the sound source at the target sound direction-of-arrival by the beamformer, regarding which at least one of a low-frequency band and a high-frequency band is substituted by the PSD estimation value of a midrange-frequency band, or to the target sound PSD input value $\hat{\varphi}_S(\omega, \tau)$ obtained on the basis of enhancement of the sound source at the target sound direction-of-arrival by the beamformer, regarding which at least one of a low-frequency band and a high-frequency band is substituted by target sound PSD estimation values of a midrange-frequency band.

5. The PSD optimization device according to claim 1, wherein the optimization problem of the cost function is defined as a problem in which $u=[u_S^T, u_{IN}^T, u_{BN}^T]^T$ and v is an auxiliary variable of the variable u, and $\inf_{u,v} F_1(u)+F_2(v)$, where $F_1$ and $F_2$ are each a convex function configuring a cost function is solved under linear constraints relating to the variables u and v, and wherein the linear constraints relating to the variables u and v include constraints based on difference in sound source enhancement characteristics of the beamformer in accordance with the degree of inclusion of the target sound, with regard to the PSD of the signals beamformed in the target sound direction-of-arrival or constraints based on difference in sound source enhancement characteristics of the beamformer in frequency direction with regard to the PSD of the signals beamformed in the target sound direction-of-arrival, or the cost function $F_1(u)+F_2(v)$ includes convex cost terms based on difference in sound source enhancement characteristics of the beamformer in accordance with the degree of inclusion of the target sound, with regard to the PSD of the signals beamformed in the target sound direction-of-arrival or convex cost terms based on difference in sound source enhancement characteristics of the beamformer in frequency direction with regard to the PSD of the signals beamformed in the target sound direction-of-arrival.

6. The PSD optimization device according to claim 5, wherein linear constraints regarding the variables u and v are $$Au = v,$$
$$Bu = c,$$
$$u \geq 0$$

where $A=[\Lambda\ 0\ 0]$, $B=[I, I, I]$, c is the PSD estimation value of enhanced signals of the sound source at the target sound direction-of-arrival $\theta_S$, $\Lambda(\in R^{\Omega \times \Omega})$ is the frequency weighting matrix $\Lambda_w$, $I(\in R^{\Omega \times \Omega})$ is an identity matrix, and $\Omega$ is a count of frequency bands,
wherein $F_1(u)$ and $F_2(v)$ are each $$F_1(u) = \frac{1}{2}\left\|W^{\frac{1}{2}}(u-\zeta)\right\|_2^2$$

$$F_2(v) = \mu\|v\|_1 + \frac{\rho}{2}\|v - \hat{v}_{\varphi_S}\|_2^2$$

where $$W^{\frac{1}{2}} = \begin{bmatrix} \sqrt{w_S}I & 0 & 0 \\ 0 & \sqrt{w_{IN}}I & 0 \\ 0 & 0 & \sqrt{w_{BN}}I \end{bmatrix}$$

$$(w_S, w_{IN}, w_{BN} \in R^+),$$

$$\zeta = [\zeta_S^T, \hat{\varphi}_{IN}^T, \hat{\varphi}_{BN}^T]^T$$

$$\zeta_S = [\hat{\varphi}_{S-Low}^T, c_{Mid}^T, \hat{\varphi}_{S-High}^T]^T$$

$$\hat{\varphi}_{S-Low}^T = [\hat{\varphi}_S(0, \tau), \hat{\varphi}_S(1, \tau), \cdots, \hat{\varphi}_S(\omega_L - 1, \tau)]^T$$

$$c_{Mid} = [c(\omega_L, \tau), c(\omega_L+1, \tau), \cdots, c(\omega_H, \tau)]^T$$

$$\hat{\varphi}_{S-High}^T = [\hat{\varphi}_S(\omega_H+1, \tau), \hat{\varphi}_S(\omega_H+2, \tau), \cdots, \hat{\varphi}_S(\Omega-1, \tau)]^T$$

$$\hat{\varphi} = [\hat{\varphi}_S^T, \hat{\varphi}_{IN}^T, \hat{\varphi}_{BN}^T]^T,$$

$$\hat{v}_{\varphi_S} = A\hat{\varphi},$$

$\mu$, $\rho(\in R^+)$ are weighting coefficients, and $0 < \omega_L < \omega_H < \Omega - 1$,
wherein functions $D_p^*$, $D_q^*$, and $D_r^*$, and dual variables $\tilde{p}$, $\tilde{q}$, and $\tilde{r}$, regarding dual variables p, q, and r, are each defined in the following Expression, $$D_p^\bullet = D_p^{-1},$$

$$D_q^\bullet = D_q^{-1},$$

$$D_r^\bullet = D_r^{-1}$$

$$\tilde{p} = \nabla D_p(p),$$

$$\tilde{q} = \nabla D_q(q),$$

$$\tilde{r} = \nabla D_r(r)$$

wherein the PSD updating unit includes:
a first variable calculator that calculates $u^{t+1}$, which is a result of updating the variable u for a t+1'th time, by the following Expression, $$u^{t+1} = \operatorname*{argmin}_u\left(F_1(u) + J_{D_p^\bullet}(Au\|\tilde{p}^t) + J_{D_q^\bullet}(Bu\|\tilde{q}^t - c) + J_{D_r^\bullet}(u\| - \tilde{r}^t)\right)$$

a first dual variable calculator that calculates $\tilde{p}^{t+1/2}$, which is an intermediate updating result of the dual variable $\tilde{p}$ for the t+1'th time, by the following Expression, $$\tilde{p}^{t+1/2} = \tilde{p}^t - 2Au^{t+1}$$

a second dual variable calculator that calculates $\tilde{q}^{t+1}$, which is a result of updating the dual variable $\tilde{q}$ for the t+1'th time, by the following Expression, $$\tilde{q}^{t+1} = \tilde{q}^t - 2(Bu^{t+1} - c)$$

a third dual variable calculator that calculates $\tilde{r}^{t+1/2}$, which is an intermediate updating result of the dual variable $\tilde{r}$ for the t+1'th time, by the following Expression, $$\tilde{r}^{t+1/2} = \tilde{r}^t - 2u^{t+1}$$

a second variable calculator that calculates $v^{t+1}$, which is a result of updating the auxiliary variable v for the t+1'th time, by the following Expression, $$v^{t+1} = \operatorname*{argmin}_v\left(F_2(v) + J_{D_p^\bullet}(v\| - \tilde{p}^{t+1/2})\right)$$

a fourth dual variable calculator that calculates $\tilde{p}^{t+1}$, which is a result of updating the dual variable $\tilde{p}$ for the t+1'th time, by the following Expression, and $$\tilde{p}^{t+1} = \tilde{p}^{t+1/2} + 2v^{t+1}$$

a fifth dual variable calculator that sets $\tilde{r} = [\tilde{r}_1^T, \tilde{r}_2^T, \tilde{r}_3^T]^T$, and calculates $\tilde{r}^{t+1}$, which is a result of updating the dual variable $\tilde{r}$ for the t+1'th time, by the following Expression.

$$\tilde{r}_i^{t+1} = \begin{cases} \tilde{r}_i^{t+1/2} & (\text{if } \tilde{r}_i^{t+1/2} \geq 0) \\ -\tilde{r}_i^{t+1/2} & (\text{otherwise}) \end{cases}$$

$$(i = 1, 2, 3)$$

7. The PSD optimization device according to claim 1, wherein the optimization problem of the cost function is defined as a problem in which $u = [u_S^T, u_{IN}^T, u_{BN}^T]^T$, and $\inf_u F_1(u)$, where $F_1$ is a convex cost function, is solved under linear constraints relating to the variable u,
and wherein the linear constraints relating to the variable u include constraints based on difference in sound source enhancement characteristics of the beamformer in accordance with the degree of inclusion of the target sound, with regard to the PSD of the signals beamformed in the target sound direction-of-arrival or constraints based on difference in sound source enhancement characteristics of the beamformer in frequency direction with regard to the PSD of the signals beamformed in the target sound direction-of-arrival, or the cost function $F_1(u)$ includes convex cost terms based on difference in sound source enhancement characteristics of the beamformer in accordance with the degree of inclusion of the target sound, with regard to the PSD of the signals beamformed in the target sound direction-of-arrival or convex cost terms based on difference in sound source enhancement characteristics of the beamformer in frequency direction with regard to the PSD of the signals beamformed in the target sound direction-of-arrival.

8. A power spectral density (PSD) optimization method including a PSD updating step, in which,
with $u_S$ as a variable representing a target sound PSD, $u_{IN}$ as a variable representing an interference noise PSD, and $u_{BN}$ as a variable representing a background noise PSD,
a PSD optimization device takes a target sound PSD input value $\hat{\varphi}_S(\omega, \tau)$, an interference noise PSD input value $\hat{\varphi}_{IN}(\Omega, \tau)$, and a background noise PSD input value $\hat{\varphi}_{BN}(\omega, \tau)$ as input, and generates a target sound PSD output value $\varphi_S(\Omega, \tau)$, an interference noise PSD output value $\varphi_{IN}(\Omega, \tau)$, and a background noise PSD output value $\varphi_{BN}(\Omega, \tau)$, by solving an optimization problem for a cost function relating to the variable $u_S$, the variable $u_{IN}$, and the variable $u_{BN}$,
wherein the optimization problem for the cost function is defined using at least one of:
a constraint based on difference in sound source enhancement characteristics of a beamformer in accordance with a degree of inclusion of a target sound, with regard to a PSD of signals beamformed in a target sound direction-of-arrival,
a convex cost term based on the difference in sound source enhancement characteristics of the beamformer in accordance with the degree of inclusion of the target sound, with regard to the PSD of signals beamformed in the target sound direction-of-arrival,
a constraint based on the difference in sound source enhancement characteristics of the beamformer in a frequency direction, with regard to the PSD of signals beamformed in the target sound direction-of-arrival, and
a convex cost term based on the difference in sound source enhancement characteristics of the beamformer in the frequency direction, with regard to the PSD of signals beamformed in the target sound direction-of-arrival.

9. The PSD optimization method according to claim 8, wherein the convex cost term based on the difference in sound source enhancement characteristics of the beamformer in accordance with the degree of inclusion of the target sound is a convex cost term that is derived on the basis of an assumption that the more dominant the target sound is, the closer the value of the variable $u_S$ will be to a PSD estimation value c of enhanced signals of the sound source at the target sound direction-of-arrival by the beamformer, or to the target sound PSD input value $\hat{\varphi}_S(\omega, \tau)$ obtained on the basis of enhancement of the sound source at the target sound direction-of-arrival by the beamformer.

10. The PSD optimization method according to claim 8, wherein the convex cost term based on the difference in sound source enhancement characteristics of the beamformer in the frequency direction is a convex cost term that is derived on the basis of an assumption that the value of the variable $u_S$ is close to a PSD estimation value c of enhanced signals of the sound source at the target sound direction-of-arrival by the beamformer, or to the target sound PSD input value $\hat{\varphi}_S(\omega, \tau)$ obtained on the basis of enhancement of the sound source at the target sound direction-of-arrival by the beamformer, in a midrange-frequency band.

11. The PSD optimization method according to claim 8, wherein the convex cost term based on the difference in sound source enhancement characteristics of the beamformer in the frequency direction is a convex cost term that is derived on the basis of an assumption that the value of the variable $u_S$ is close to a PSD estimation value c of enhanced signals of the sound source at the target sound direction-of-arrival by the beamformer, regarding which at least one of a low-frequency band and a high-frequency band is substituted by the PSD estimation value of a midrange-frequency band, or to the target sound PSD input value $\hat{\varphi}_S(\omega, \tau)$ obtained on the basis of enhancement of the sound source at the target sound direction-of-arrival by the beamformer, regarding which at least one of a low-frequency band and a high-frequency band is substituted by target sound PSD estimation values of a midrange-frequency band.

12. The PSD optimization method according to claim 8, wherein the optimization problem of the cost function is defined as a problem in which $u=[u_S^T, u_{IN}^T, U_{BN}^T]^T$ and v is an auxiliary variable of the variable u, and $\inf_{u,v} F_1(u)+F_2(v)$, where $F_1$ and $F_2$ are each a convex function configuring a cost function is solved under linear constraints relating to the variables u and v, and wherein the linear constraints relating to the variables u and v include constraints based on difference in sound source enhancement characteristics of the beamformer in accordance with the degree of inclusion of the target sound, with regard to the PSD of the signals beamformed in the target sound direction-of-arrival or constraints based on difference in sound source enhancement characteristics of the beamformer in frequency direction with regard to the PSD of the signals beamformed in the target sound direction-of-arrival, or the cost function $F_1(u)+F_2(v)$ includes convex cost terms based on difference in sound source enhancement characteristics of the beamformer in accordance with the degree of inclusion of the target sound, with regard to the PSD of the signals beamformed in the target sound direction-of-arrival or convex cost terms based on difference in sound source enhancement characteristics of the beamformer in frequency direction with regard to the PSD of the signals beamformed in the target sound direction-of-arrival.

13. The PSD optimization method according to claim 8, wherein the optimization problem of the cost function is defined as a problem in which $u=[u_S^T, u_{IN}^T, u_{BN}^T]^T$, and $\inf_u F_1(u)$, where $F_1$ is a convex cost function, is solved under linear constraints relating to the variable u, and wherein the linear constraints relating to the variable u include constraints based on difference in sound source enhancement characteristics of the beamformer in accordance with the degree of inclusion of the target sound, with regard to the PSD of the signals beamformed in the target sound direction-of-arrival or constraints based on difference in sound source enhancement characteristics of the beamformer in frequency direction with regard to the PSD of the signals beamformed in the target sound direction-of-arrival, or the cost function $F_1(u)$ includes convex cost terms based on difference in sound source enhancement characteristics of the beamformer in accordance with the degree of inclusion of the target sound, with regard to the PSD of the signals beamformed in the target sound direction-of-arrival or convex cost terms based on difference in sound source enhancement characteristics of the beamformer in frequency direction with regard to the PSD of the signals beamformed in the target sound direction-of-arrival.

14. A non-transitory computer-readable medium having computer-readable instructions stored thereon, which, when executed, cause a computer including a memory and a processor to execute a set of operations, comprising:

obtaining a target sound PSD input value $\hat{\varphi}_S(\Omega, \tau)$, an interference noise PSD input value $\hat{\varphi}_{IN}(\Omega, \tau)$, and a background noise PSD input value $\hat{\varphi}_{BN}(\Omega, \tau)$ as input, with us as a variable representing a target sound PSD, $u_{IN}$ as a variable representing an interference noise PSD, and $u_{BN}$ as a variable representing a background noise PSD, and generating a target sound PSD output value $\varphi_S(\Omega, \tau)$, an interference noise PSD output value $\varphi_{IN}(\Omega, \tau)$, and a background noise PSD output value $\varphi_{BN}(\Omega, \tau)$, by solving an optimization problem for a cost function relating to the variable $u_S$, the variable $u_{IN}$, and the variable $u_{BN}$, wherein the optimization problem for the cost function is defined using at least one of:
a constraint based on difference in sound source enhancement characteristics of a beamformer in accordance with a degree of inclusion of a target sound, with regard to a PSD of signals beamformed in a target sound direction-of-arrival,
a convex cost term based on the difference in sound source enhancement characteristics of the beamformer in accordance with the degree of inclusion of the target sound, with regard to the PSD of signals beamformed in the target sound direction-of-arrival,
a constraint based on the difference in sound source enhancement characteristics of the beamformer in a frequency direction, with regard to the PSD of signals beamformed in the target sound direction-of-arrival, and
a convex cost term based on the difference in sound source enhancement characteristics of the beamformer in the frequency direction, with regard to the PSD of signals beamformed in the target sound direction-of-arrival.

15. The non-transitory computer-readable medium according to claim 14,
wherein the convex cost term based on the difference in sound source enhancement characteristics of the beamformer in accordance with the degree of inclusion of the target sound is a convex cost term that is derived on the basis of an assumption that the more dominant the target sound is, the closer the value of the variable $u_S$ will be to a PSD estimation value c of enhanced signals of the sound source at the target sound direction-of-arrival by the beamformer, or to the target sound PSD input value $\hat{\varphi}_S(\omega, \tau)$ obtained on the basis of enhancement of the sound source at the target sound direction-of-arrival by the beamformer.

16. The non-transitory computer-readable medium according to claim 14,
wherein the convex cost term based on the difference in sound source enhancement characteristics of the beamformer in the frequency direction is a convex cost term that is derived on the basis of an assumption that the value of the variable $u_S$ is close to a PSD estimation value c of enhanced signals of the sound source at the target sound direction-of-arrival by the beamformer, or to the target sound PSD input value $\hat{\varphi}_S(\omega, \tau)$ obtained on the basis of enhancement of the sound source at the target sound direction-of-arrival by the beamformer, in a midrange-frequency band.

17. The non-transitory computer-readable medium according to claim 14,
wherein the convex cost term based on the difference in sound source enhancement characteristics of the beamformer in the frequency direction is a convex cost term that is derived on the basis of an assumption that the value of the variable $u_S$ is close to a PSD estimation value c of enhanced signals of the sound source at the target sound direction-of-arrival by the beamformer, regarding which at least one of a low-frequency band and a high-frequency band is substituted by the PSD estimation value of a midrange-frequency band, or to the target sound PSD input value $\hat{\varphi}_S(\omega, \tau)$ obtained on the basis of enhancement of the sound source at the target sound direction-of-arrival by the beamformer, regarding which at least one of a low-frequency band and a high-frequency band is substituted by target sound PSD estimation values of a midrange-frequency band.

18. The non-transitory computer-readable medium according to claim 14,
wherein the optimization problem of the cost function is defined as a problem in which $u=[u_S^T, u_{IN}^T, u_{BN}^T]^T$ and v is an auxiliary variable of the variable u, and $\inf_{u,v} F_1(u)+F_2(v)$, where $F_1$ and $F_2$ are each a convex function configuring a cost function is solved under linear constraints relating to the variables u and v,
and wherein the linear constraints relating to the variables u and v include constraints based on difference in sound source enhancement characteristics of the beamformer in accordance with the degree of inclusion of the target sound, with regard to the PSD of the signals beamformed in the target sound direction-of-arrival or constraints based on difference in sound source enhancement characteristics of the beamformer in frequency direction with regard to the PSD of the signals beamformed in the target sound direction-of-arrival, or the cost function $F_1(u)+F_2(v)$ includes convex cost terms based on difference in sound source enhancement characteristics of the beamformer in accordance with the degree of inclusion of the target sound, with regard to the PSD of the signals beamformed in the target sound direction-of-arrival or convex cost terms based on difference in sound source enhancement characteristics of the beamformer in frequency direction with regard to the PSD of the signals beamformed in the target sound direction-of-arrival.

19. The non-transitory computer-readable medium according to claim 18,
wherein linear constraints regarding the variables u and v are $$Au = v,$$
$$Bu = c,$$
$$u \geq 0$$

where $A=[\Lambda\ 0\ 0]$, $B=[I, I, I]$, c is the PSD estimation value of enhanced signals of the sound source at the target sound direction-of-arrival $\theta_S$, $\Lambda(\in R^{\Omega\times\Omega})$ is the frequency weighting matrix $\Lambda_w$, $I(\in R^{\Omega\times\Omega})$ is an identity matrix, and $\Omega$ is a count of frequency bands,
wherein $F_1(u)$ and $F_2(v)$ are each $$F_1(u) = \frac{1}{2}\left\|W^{\frac{1}{2}}(u - \zeta)\right\|_2^2$$

$$F_2(v) = \mu\|v\|_1 + \frac{\rho}{2}\|v - \hat{v}_{\varphi_S}\|_2^2$$

where $$W^{\frac{1}{2}} = \begin{bmatrix} \sqrt{w_S}I & 0 & 0 \\ 0 & \sqrt{w_{IN}}I & 0 \\ 0 & 0 & \sqrt{w_{BN}}I \end{bmatrix}$$

$(w_S, w_{IN}, w_{BN} \in R^+)$, $$\zeta = [\zeta_S^T, \hat{\varphi}_{IN}^T, \hat{\varphi}_{BN}^T]^T$$

$$\zeta_S = [\hat{\varphi}_{S-Low}^T, c_{Mid}^T, \hat{\varphi}_{S-High}^T]^T$$

$$\hat{\varphi}_{S-Low}^T = [\hat{\varphi}_S(0, \tau), \hat{\varphi}_S(1, \tau), \cdots, \hat{\varphi}_S(\omega_L - 1, \tau)]^T$$

$$c_{Mid} = [c(\omega_L, \tau), c(\omega_L + 1, \tau), \cdots, c(\omega_H, \tau)]^T$$

$$\hat{\varphi}_{S-High}^T = [\hat{\varphi}_S(\omega_H + 1, \tau), \hat{\varphi}_S(\omega_H + 2, \tau), \cdots, \hat{\varphi}_S(\Omega - 1, \tau)]^T$$

$$\hat{\varphi} = [\hat{\varphi}_S^T, \hat{\varphi}_{IN}^T, \hat{\varphi}_{BN}^T]^T,$$

$$\hat{v}_{\varphi_S} = A\hat{\varphi},$$

$\mu$, $\rho(\in R^+)$ are weighting coefficients, and $0<\omega_L<\omega_H<\Omega-1$,
wherein functions $D_p^\bullet$, $D_q^\bullet$, and $D_r^\bullet$, and dual variables $\tilde{p}$, $\tilde{q}$, and $\tilde{r}$, regarding dual variables p, q, and r, are each defined in the following Expression, $$D_p^\bullet = D_p^{-1},$$
$$D_q^\bullet = D_q^{-1},$$
$$D_r^\bullet = D_r^{-1}$$
$$\tilde{p} = \nabla D_p(p),$$

-continued $$\tilde{q} = \nabla D_q(q),$$
$$\tilde{r} = \nabla D_r(r)$$

wherein the PSD updating unit includes:
a first variable calculator that calculates $u^{t+1}$, which is a result of updating the variable u for a t+1'th time, by the following Expression, $$u^{t+1} = \underset{u}{\mathrm{argmin}}\Big(F_1(u) + J_{D_p^*}(Au\|\tilde{p}^t) + J_{D_q^*}(Bu\|\tilde{q}^t - c) + J_{D_r^*}(u\| - \tilde{r}^t)\Big)$$

a first dual variable calculator that calculates $\tilde{p}^{t+1/2}$, which is an intermediate updating result of the dual variable $\tilde{p}$ for the t+1'th time, by the following Expression, $$\tilde{p}^{t+1/2} = \tilde{p}^{t+1} - 2Au^{t+1}$$

a second dual variable calculator that calculates $\tilde{q}^{t+1}$, which is a result of updating the dual variable $\tilde{q}$ for the t+1'th time, by the following Expression, $$\tilde{q}^{t+1} = \tilde{q}^t - 2(Bu^{t+1} - c)$$

a third dual variable calculator that calculates $\tilde{r}^{t+1/2}$, which is an intermediate updating result of the dual variable $\tilde{r}$ for the t+1'th time, by the following Expression, $$\tilde{r}^{t+1/2} = \tilde{r}^t - 2u^{t+1}$$

a second variable calculator that calculates $v^{t+1}$, which is a result of updating the auxiliary variable v for the t+1'th time, by the following Expression, $$v^{t+1} = \underset{v}{\mathrm{argmin}}\Big(F_2(v) + J_{D_p^*}(v\| - \tilde{p}^{t+1/2})\Big)$$

a fourth dual variable calculator that calculates $\tilde{p}^{t+1}$, which is a result of updating the dual variable $\tilde{p}$ for the t+1'th time, by the following Expression, and $$\tilde{p}^{t+1} = \tilde{p}^{t+1/2} + 2v^{t+1}$$

a fifth dual variable calculator that sets $\tilde{r} = [\tilde{r}_1^T, \tilde{r}_2^T, \tilde{r}_3^T]^T$, and calculates $\tilde{r}^{t+1}$, which is a result of updating the dual variable $\tilde{r}$ for the t+1'th time, by the following Expression.

$$\tilde{r}_i^{t+1} = \begin{cases} \tilde{r}_i^{t+1/2} & (\text{if } \tilde{r}_i^{t+1/2} \geq 0) \\ -\tilde{r}_i^{t+1/2} & (\text{otherwise}) \end{cases}$$
$$(i = 1, 2, 3)$$

20. The non-transitory computer-readable medium according to claim 14,
wherein the optimization problem of the cost function is defined as a problem in which $u = [u_S^T, u_{IN}^T, u_{BN}^T]^T$, and $\inf_u F_1(u)$, where $F_1$ is a convex cost function, is solved under linear constraints relating to the variable u,
and wherein the linear constraints relating to the variable u include constraints based on difference in sound source enhancement characteristics of the beamformer in accordance with the degree of inclusion of the target sound, with regard to the PSD of the signals beamformed in the target sound direction-of-arrival or constraints based on difference in sound source enhancement characteristics of the beamformer in frequency direction with regard to the PSD of the signals beamformed in the target sound direction-of-arrival, or the cost function $F_1(u)$ includes convex cost terms based on difference in sound source enhancement characteristics of the beamformer in accordance with the degree of inclusion of the target sound, with regard to the PSD of the signals beamformed in the target sound direction-of-arrival or convex cost terms based on difference in sound source enhancement characteristics of the beamformer in frequency direction with regard to the PSD of the signals beamformed in the target sound direction-of-arrival.

* * * * *